US008327652B2

(12) United States Patent
Nakaguro

(10) Patent No.: US 8,327,652 B2
(45) Date of Patent: Dec. 11, 2012

(54) VEHICLE HUMIDIFYING/DEHUMIDIFYING DEVICE WITH AN INTERMITTENT HUMIDIFYING AMOUNT INCREASING COMPONENT

(75) Inventor: Takanobu Nakaguro, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 462 days.

(21) Appl. No.: 12/594,645

(22) PCT Filed: Apr. 3, 2008

(86) PCT No.: PCT/JP2008/056661
§ 371 (c)(1),
(2), (4) Date: Oct. 5, 2009

(87) PCT Pub. No.: WO2008/126751
PCT Pub. Date: Oct. 23, 2008

(65) Prior Publication Data
US 2010/0126197 A1    May 27, 2010

(30) Foreign Application Priority Data

Apr. 6, 2007  (JP) .................................. 2007-100537

(51) Int. Cl.
*F25D 17/06* (2006.01)
*F25D 23/00* (2006.01)
*F25B 21/00* (2006.01)
*B60H 1/32* (2006.01)

(52) U.S. Cl. .................. 62/94; 62/3.4; 62/244; 62/271; 62/3.61

(58) Field of Classification Search .................... 62/271, 62/94, 3.1–3.7, 244
See application file for complete search history.

(56) References Cited

U.S. PATENT DOCUMENTS
5,042,266 A * 8/1991 Yamashita et al. .............. 62/271
(Continued)

FOREIGN PATENT DOCUMENTS
JP          2964679          8/1999
(Continued)

OTHER PUBLICATIONS

Machine Translation of JP 2000-146220 to Ito et al., "Air Conditioning Means and Air Conditioner", May 26, 2000, PAJ, all.*

(Continued)

*Primary Examiner* — Marc Norman
*Assistant Examiner* — Filip Zec
(74) *Attorney, Agent, or Firm* — Finnegan, Henderson, Farabow, Garrett & Dunner, LLP

(57) ABSTRACT

To provide a more comfortable vehicle cabin space for a passenger.
In a vehicle humidifying/dehumidifying device 10, when a control unit 26 is switched to an "intermittent operation mode", a pair of heat exchange elements 28A and 28B are heated simultaneously and intermittently. Additionally, this allows humidified air to be generated by both of the pair of heat exchange elements 28A and 28B when the pair of heat exchange elements 28A and 28B are being heated simultaneously by a heater 30. Consequently, in comparison to a case where the humidified air is generated alternately by the heat exchange elements 28A and 28B, the humidifying amount imparted to the humidified air when the humidified air is generated by a humidifying/dehumidifying unit 16 can be increased. Thus, it becomes possible to perform humidifying amount control corresponding to various situations in a vehicle cabin, and it becomes possible to provide a more comfortable vehicle cabin space for a passenger.

8 Claims, 29 Drawing Sheets

U.S. PATENT DOCUMENTS

| | | | |
|---|---|---|---|
| 5,327,739 A | 7/1994 | Ingersoll et al. | |
| 5,335,719 A | 8/1994 | Khelifa et al. | |
| 6,199,388 B1 * | 3/2001 | Fischer, Jr. | 62/90 |
| 6,205,805 B1 * | 3/2001 | Takahashi et al. | 62/271 |
| 6,481,222 B1 | 11/2002 | Denniston | |
| 6,889,512 B2 * | 5/2005 | Ebara et al. | 62/244 |
| 6,918,263 B2 * | 7/2005 | Lee et al. | 62/271 |
| 7,143,589 B2 * | 12/2006 | Smith et al. | 62/94 |

FOREIGN PATENT DOCUMENTS

| | | |
|---|---|---|
| JP | 2000-146220 | 5/2000 |
| JP | 2000-264054 | 9/2000 |
| JP | 2001-97038 | 4/2001 |
| JP | 2003-314856 | 11/2003 |
| JP | 2005-140420 | 6/2005 |
| JP | 2006-105576 | 4/2006 |
| JP | 2006-232232 | 9/2006 |
| JP | 2006-264584 | 10/2006 |
| JP | 2006-306293 | 11/2006 |

OTHER PUBLICATIONS

Decision of Patent Grant for Korean Appl. No. 2009-7022950 dated Aug. 30, 2011.

Notice of Reasons for Rejection for JP Appl. No. 2007-100537 dated Nov. 24, 2010.

Extended European Search Report for EP Appl. No. 08739768.3 dated May 20, 2010.

* cited by examiner

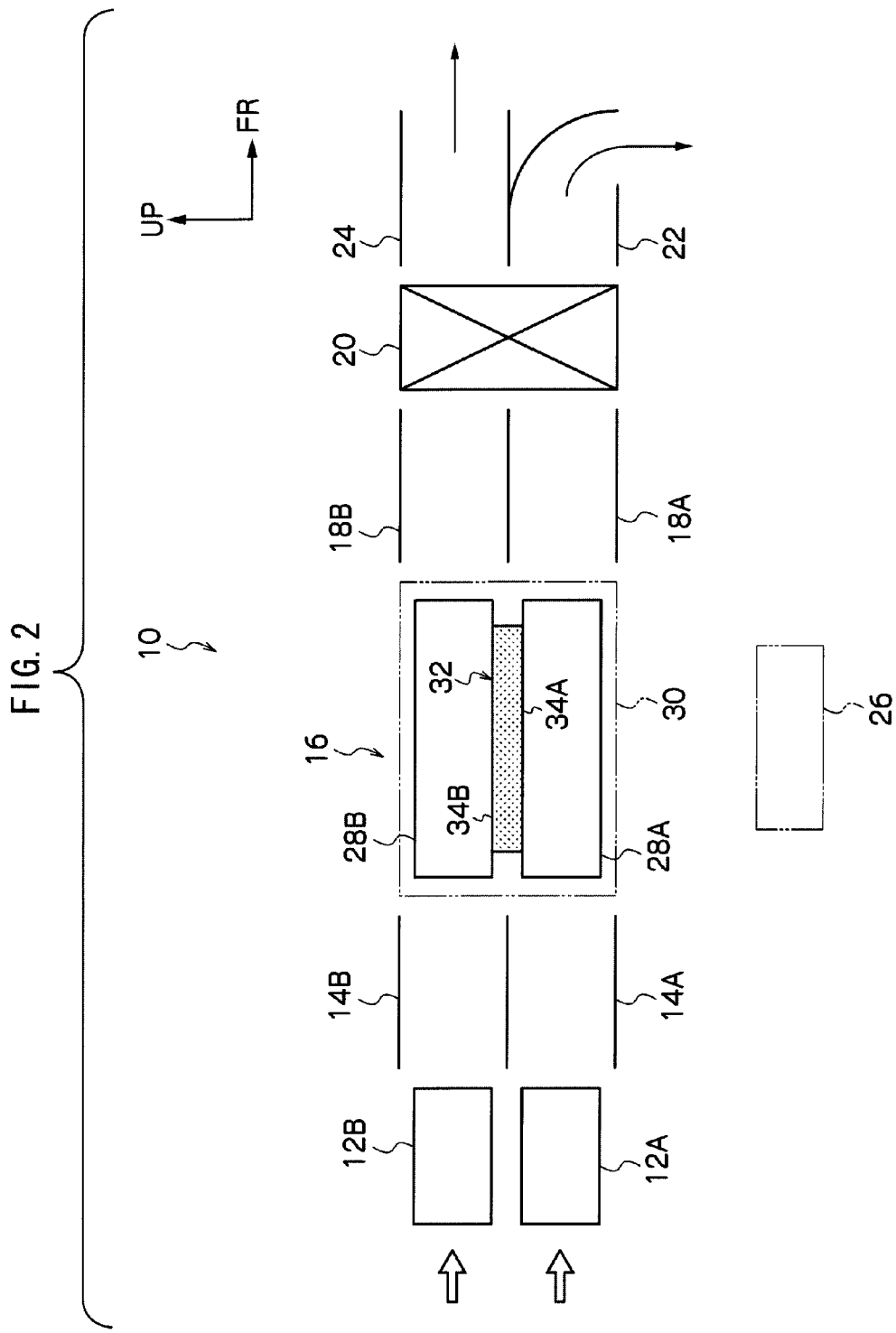

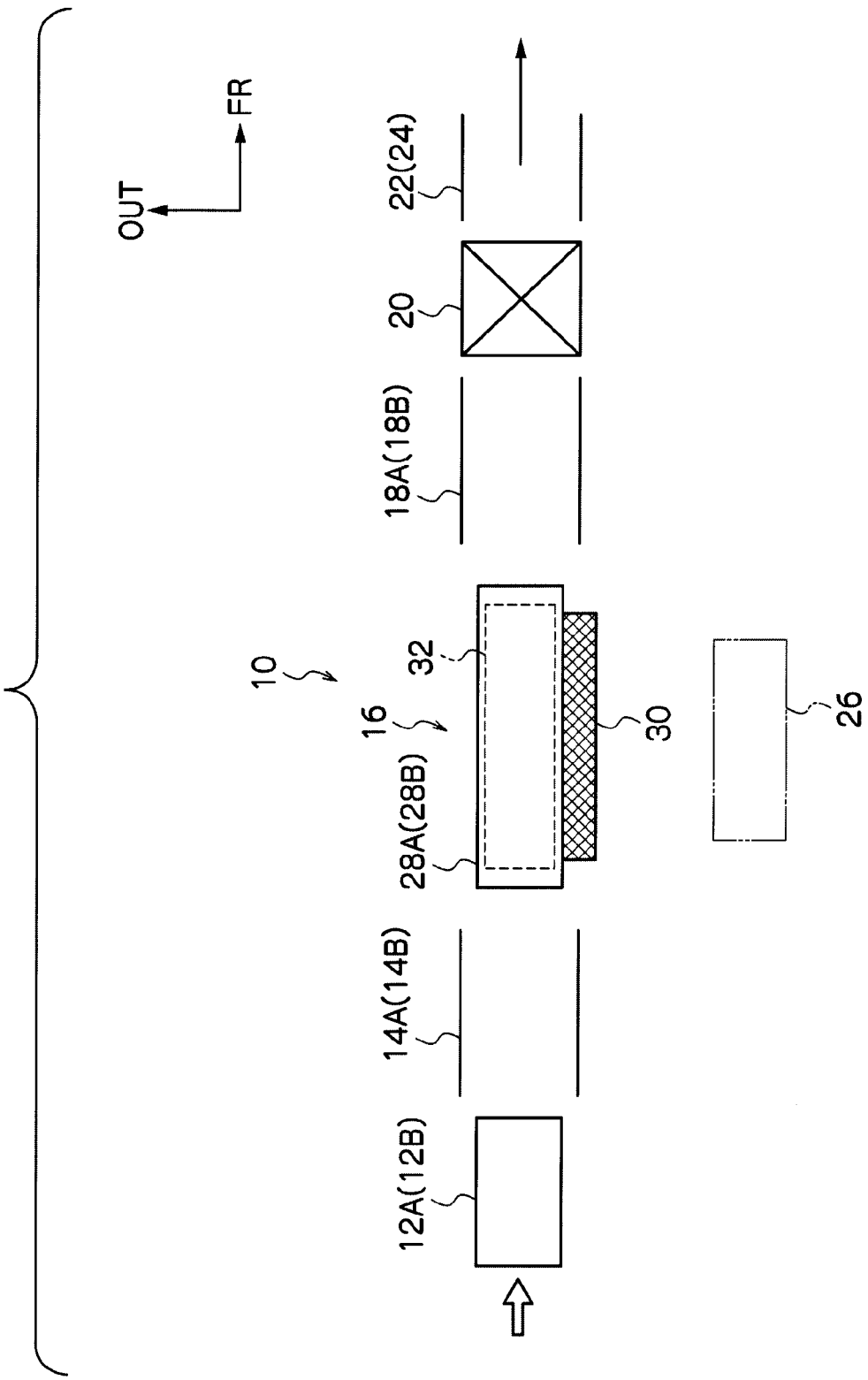

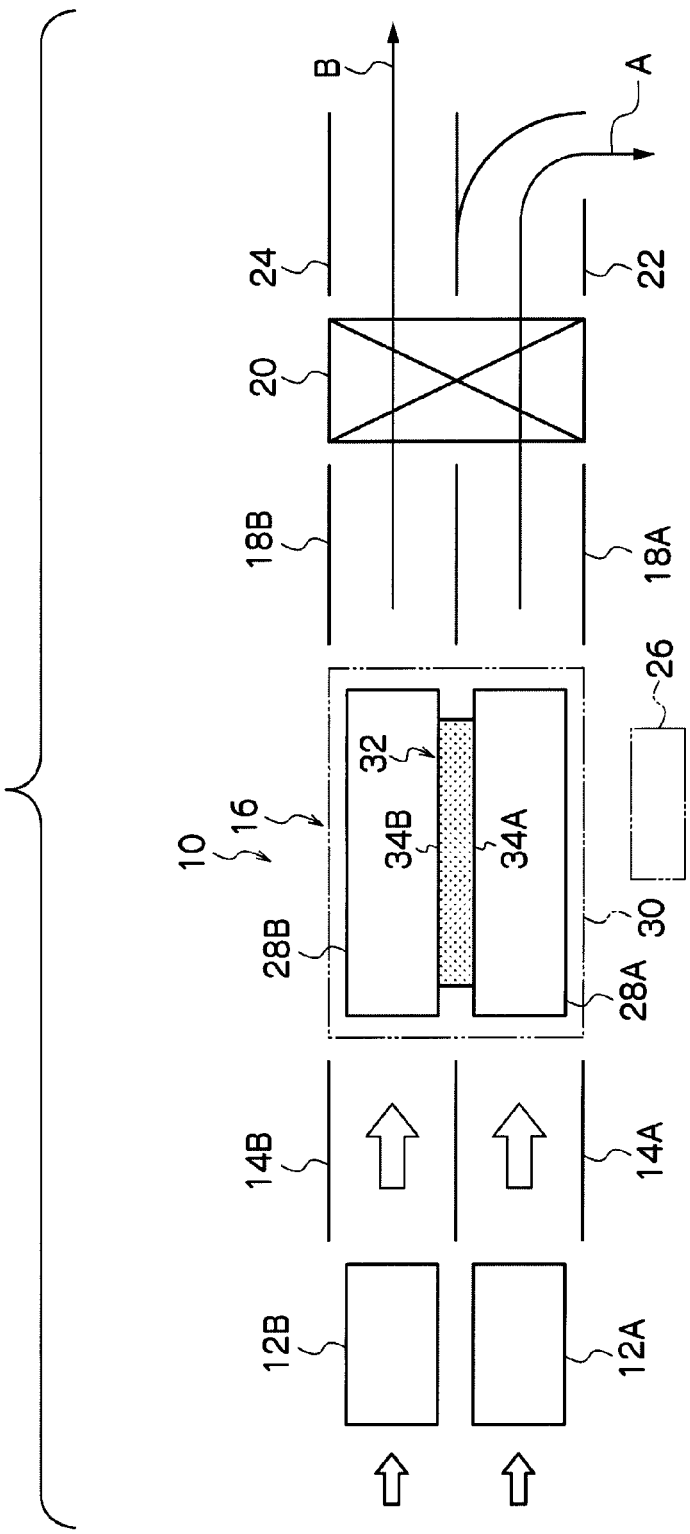

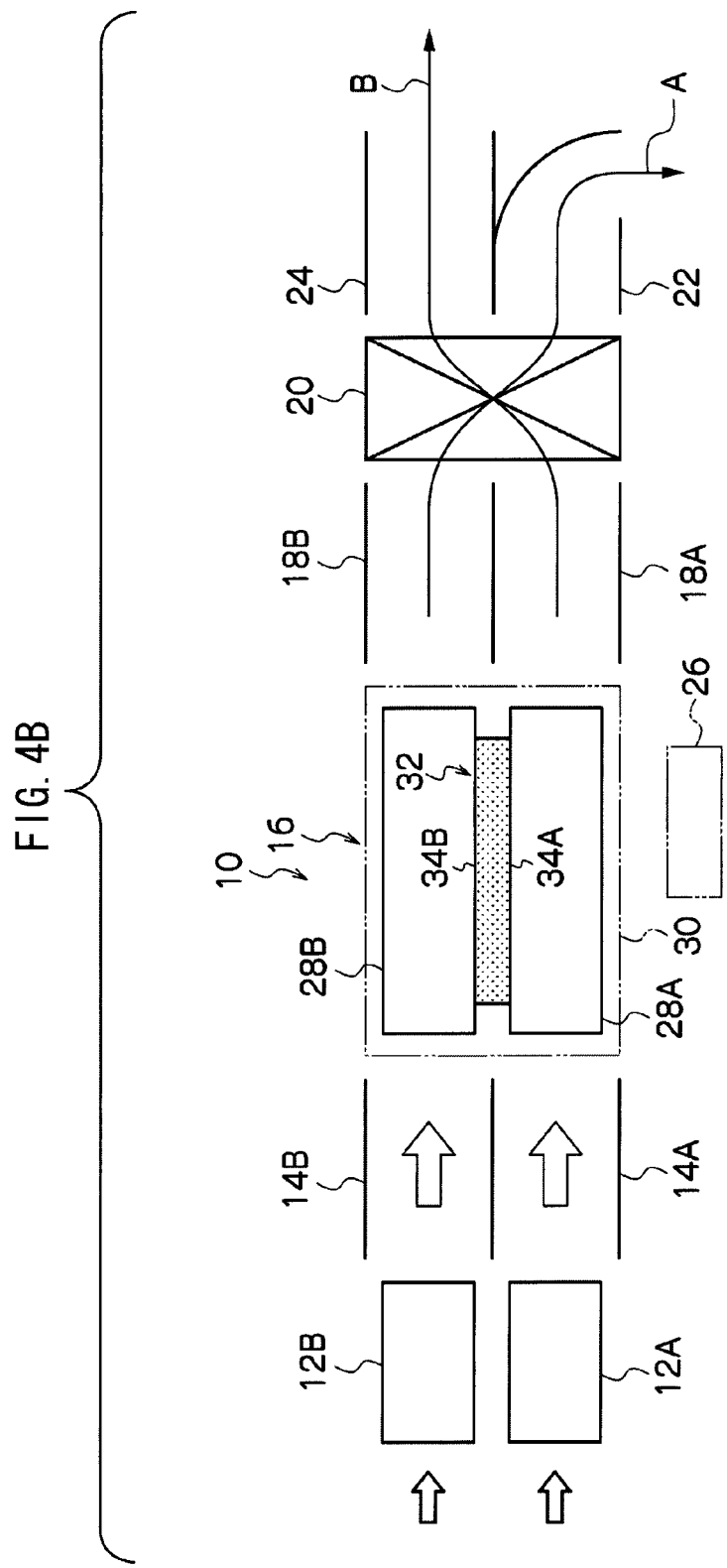

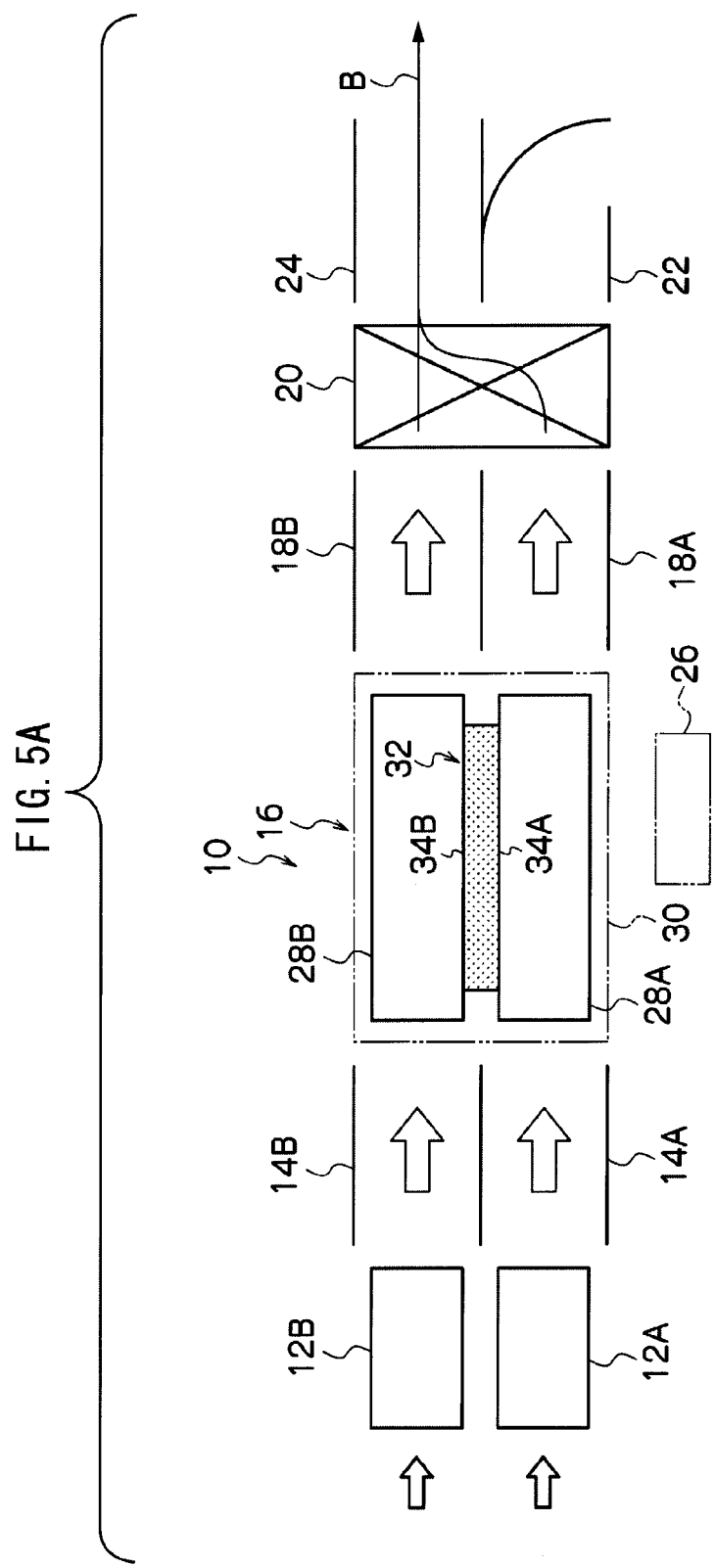

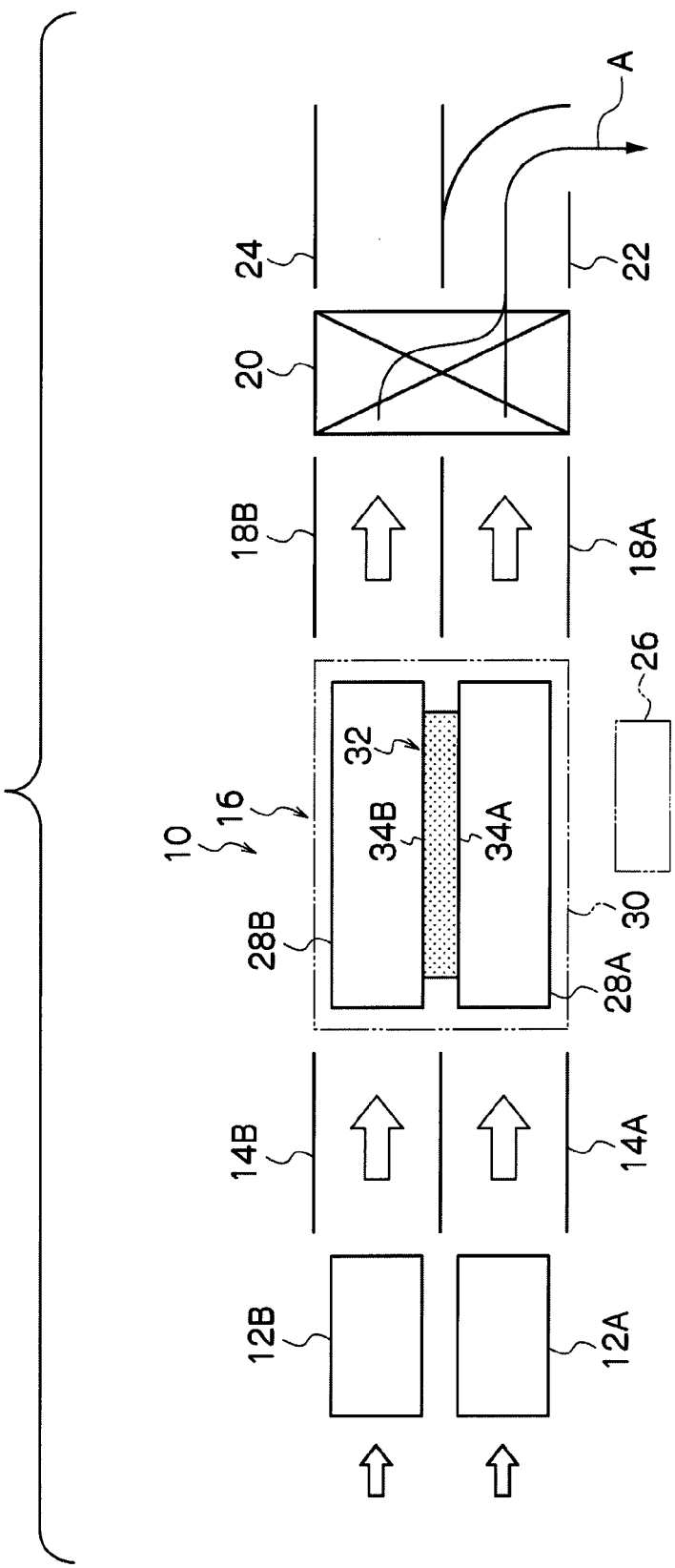

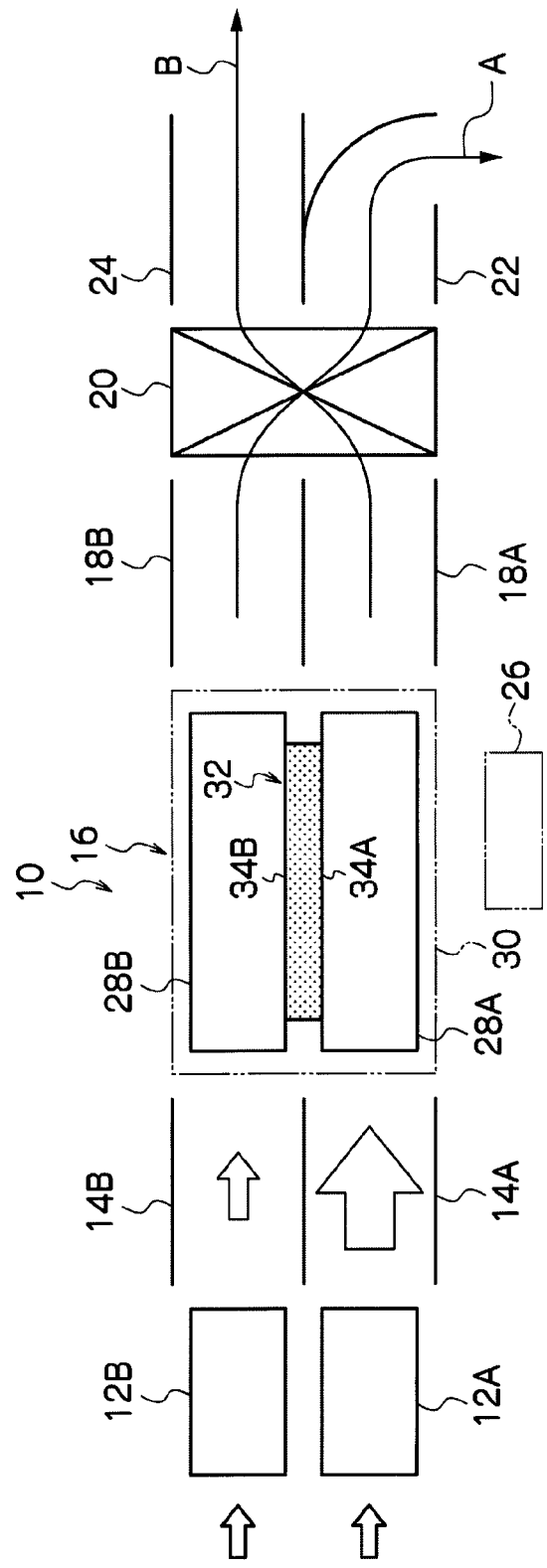

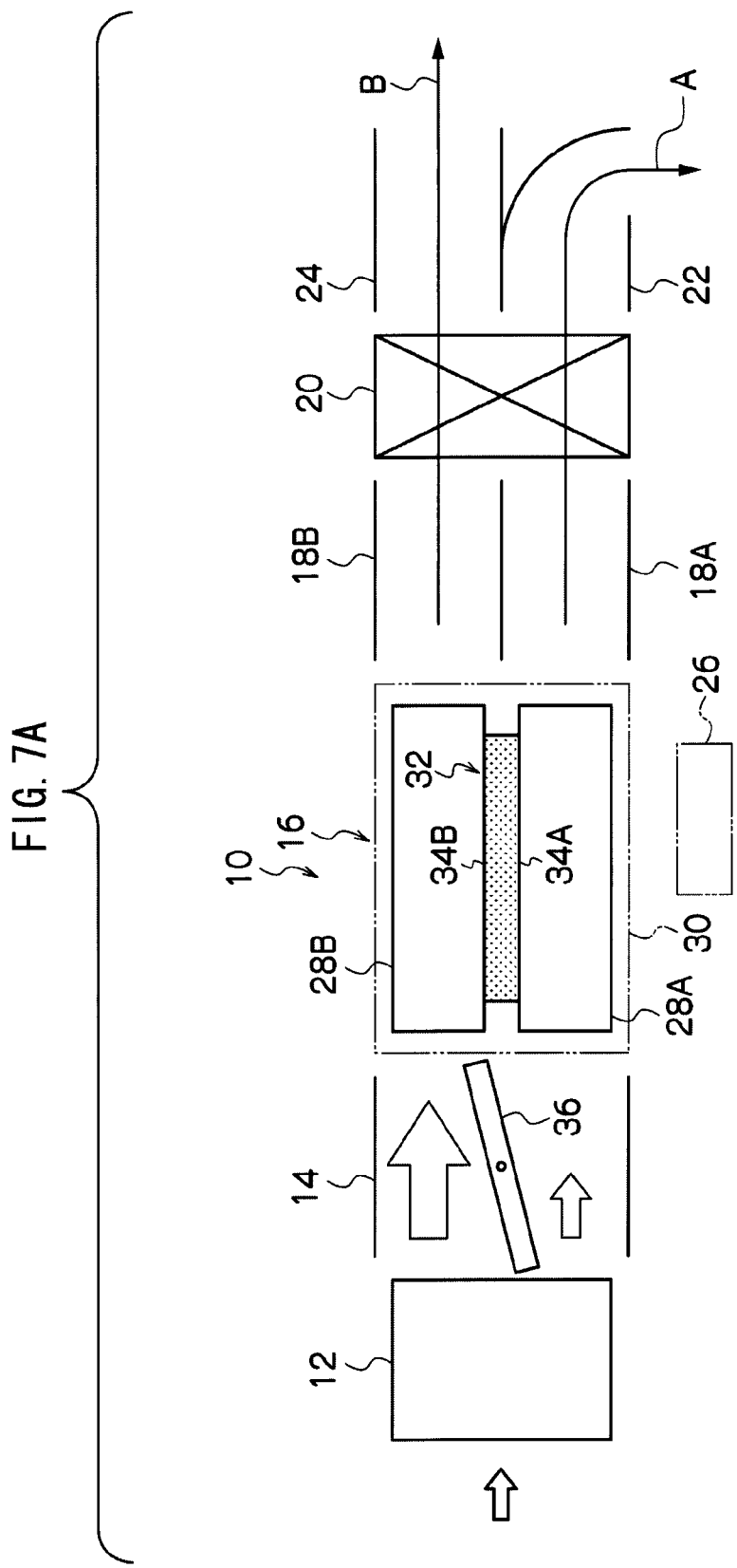

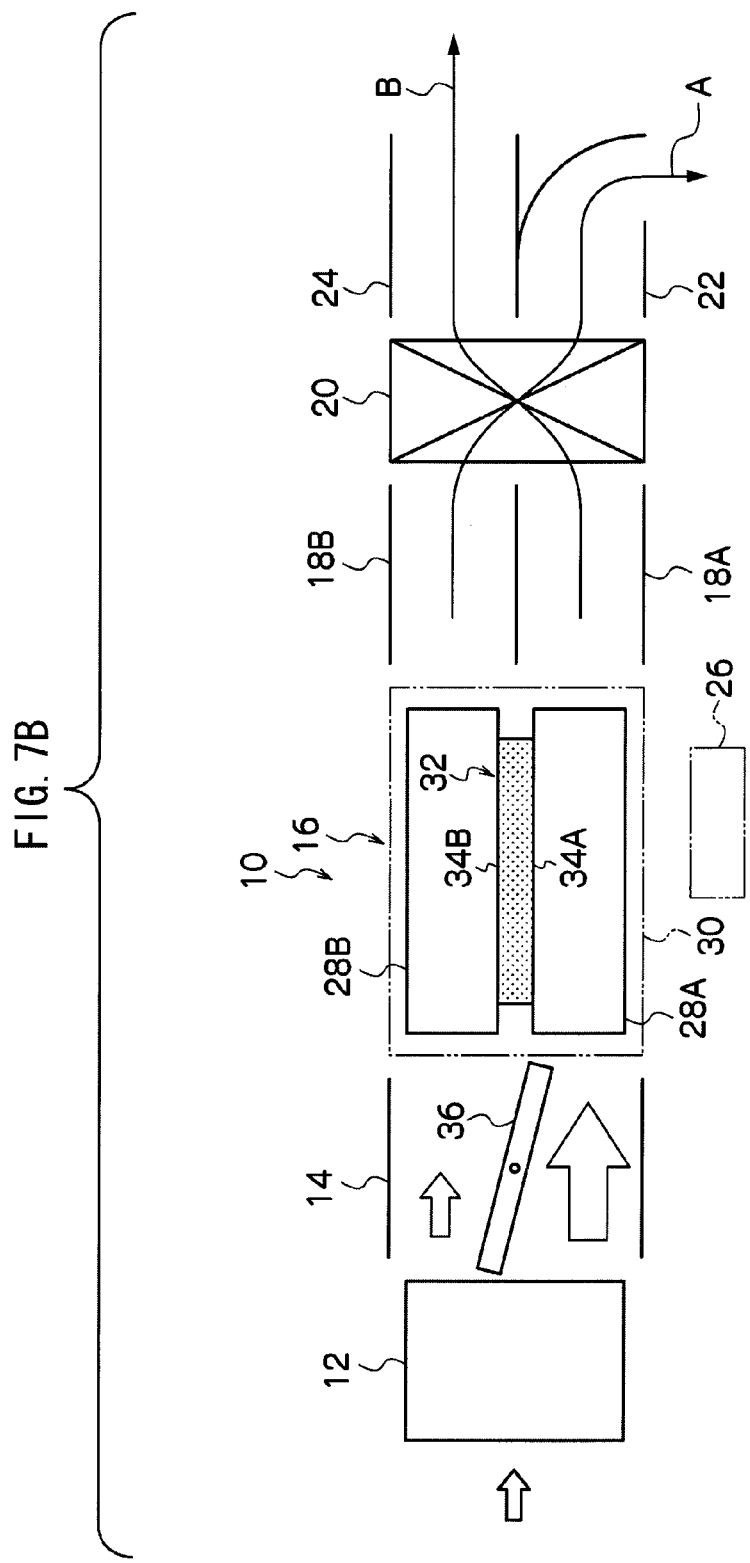

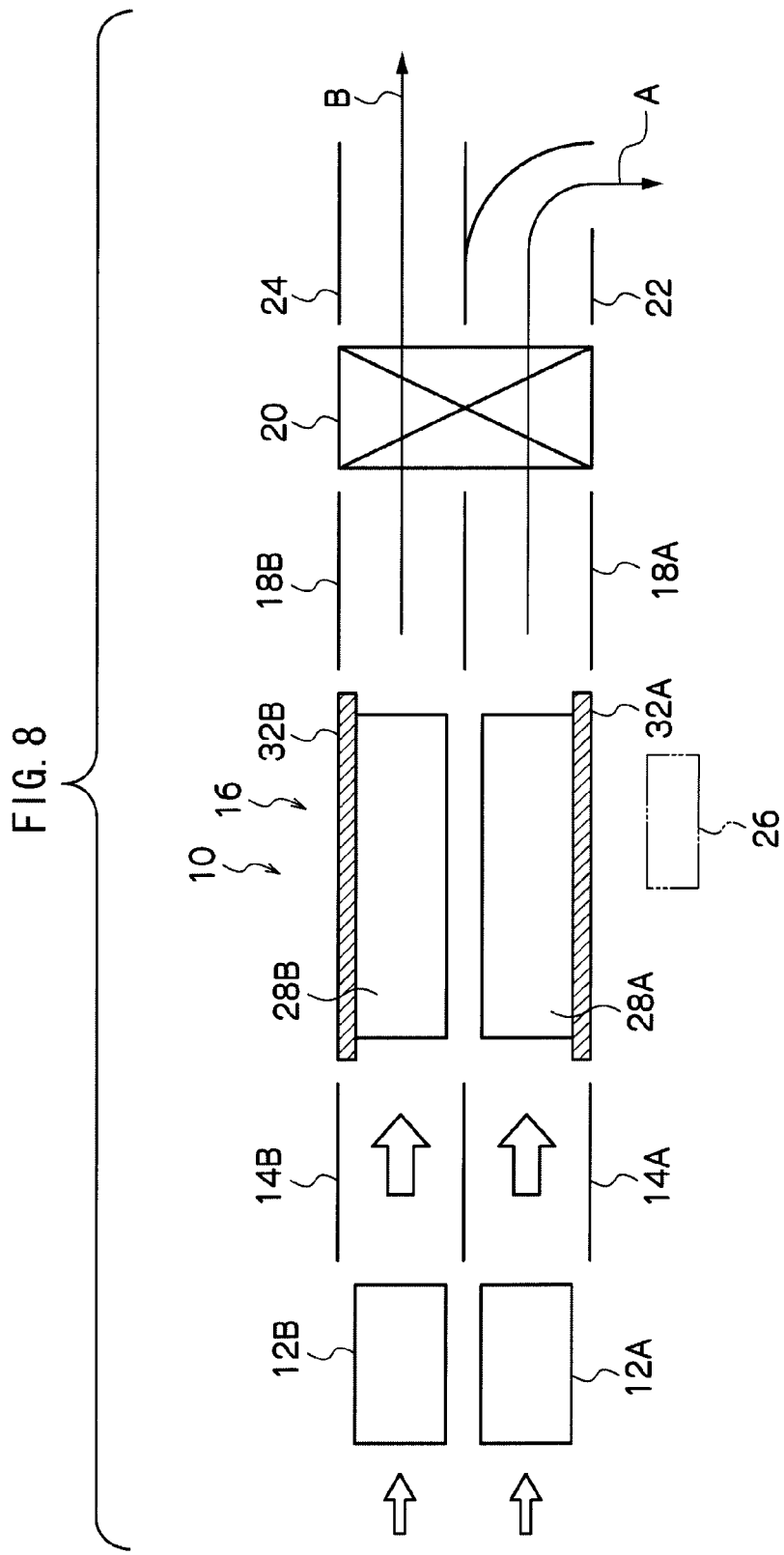

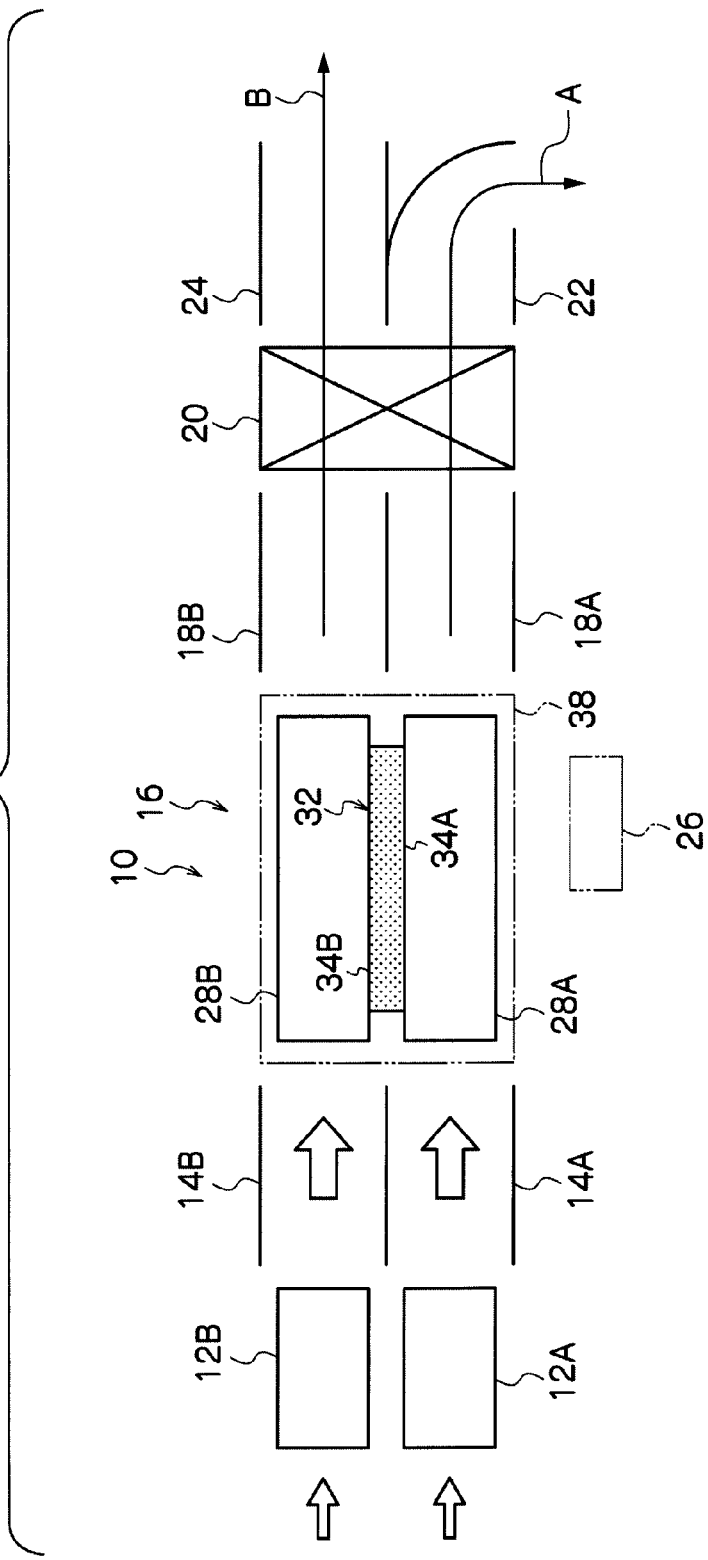

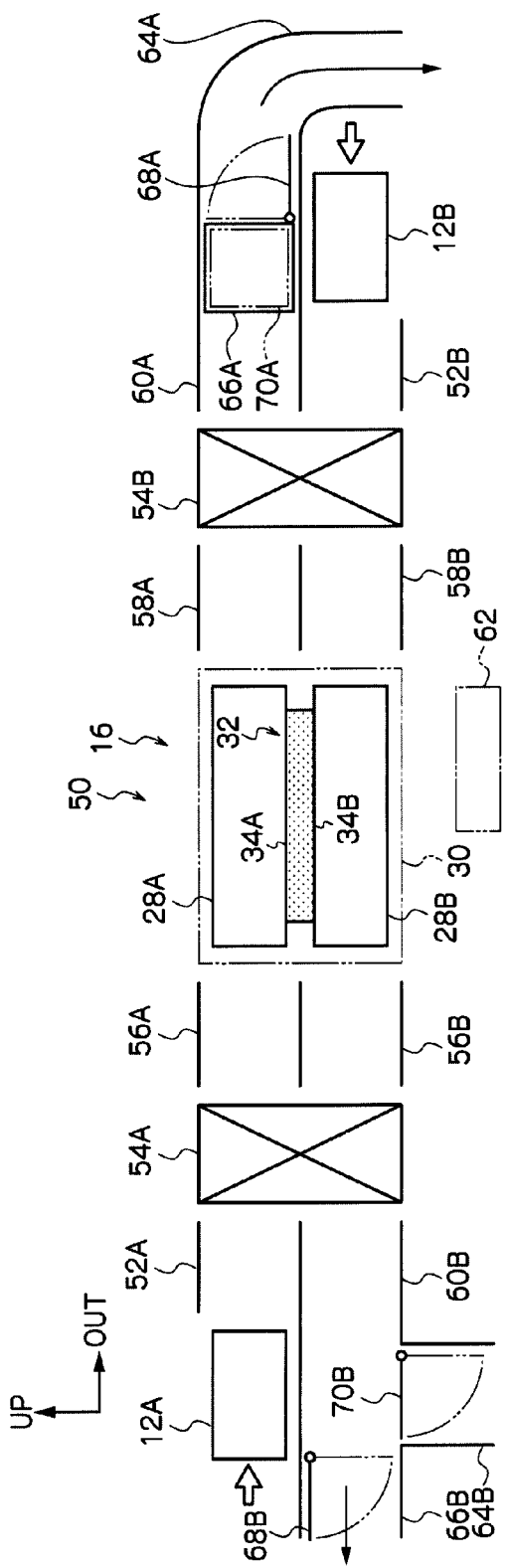

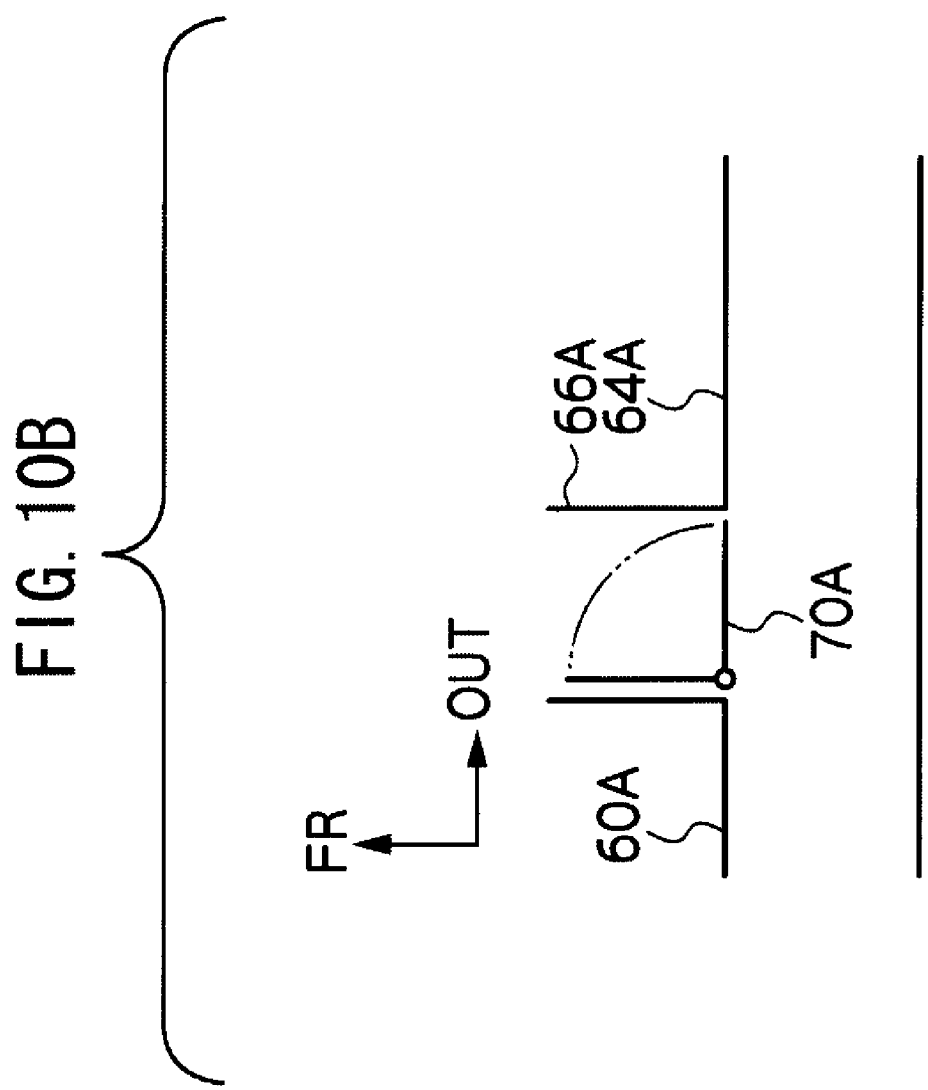

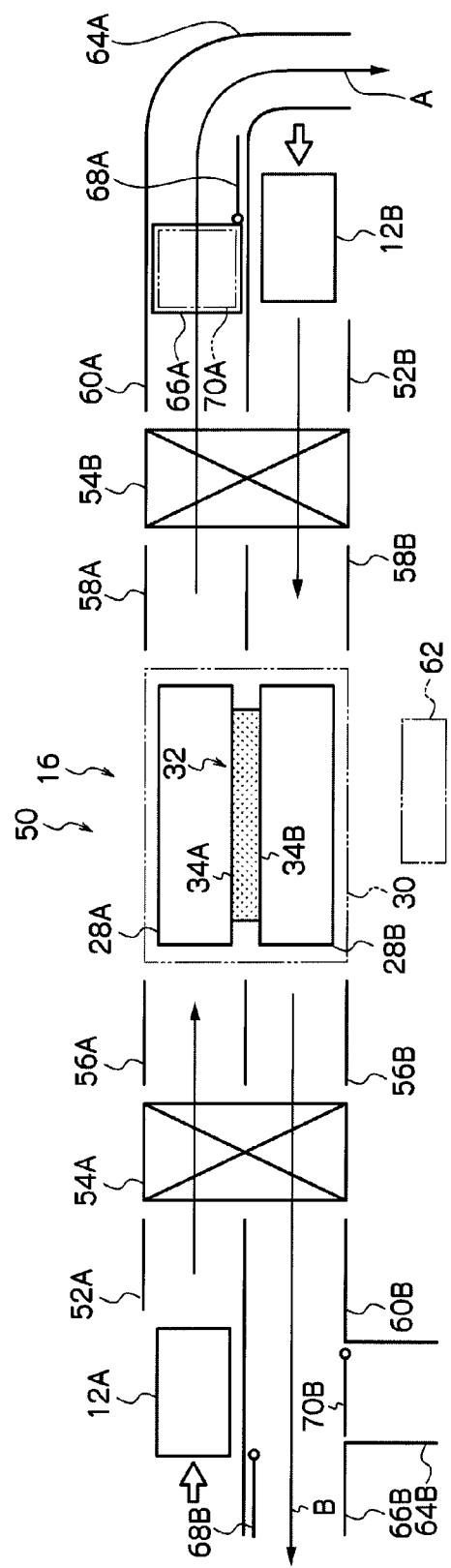

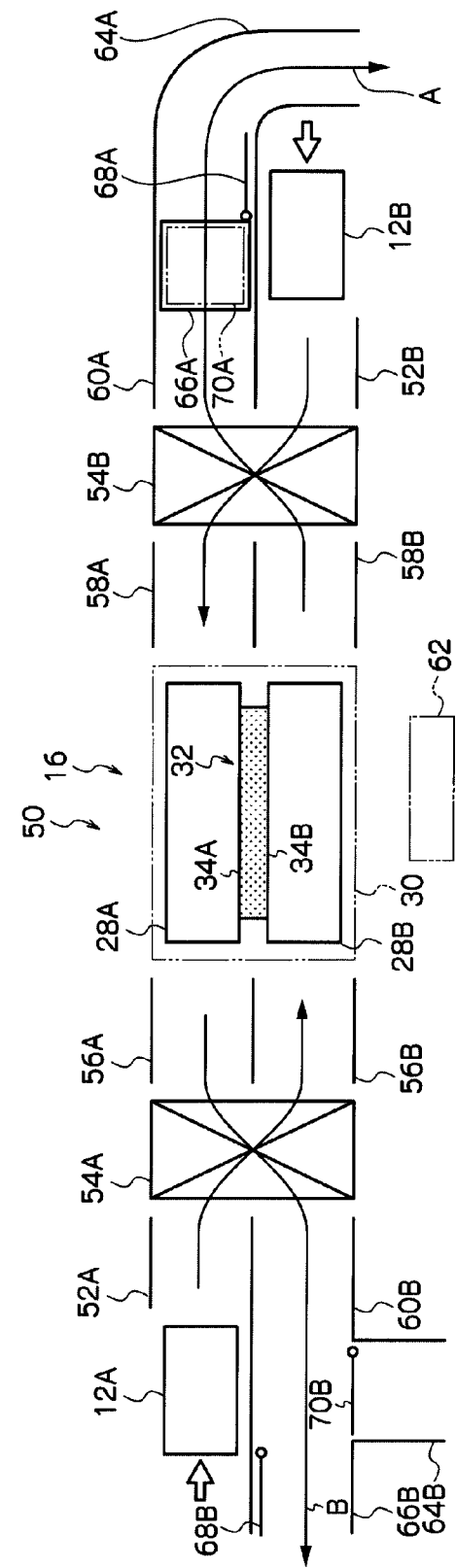

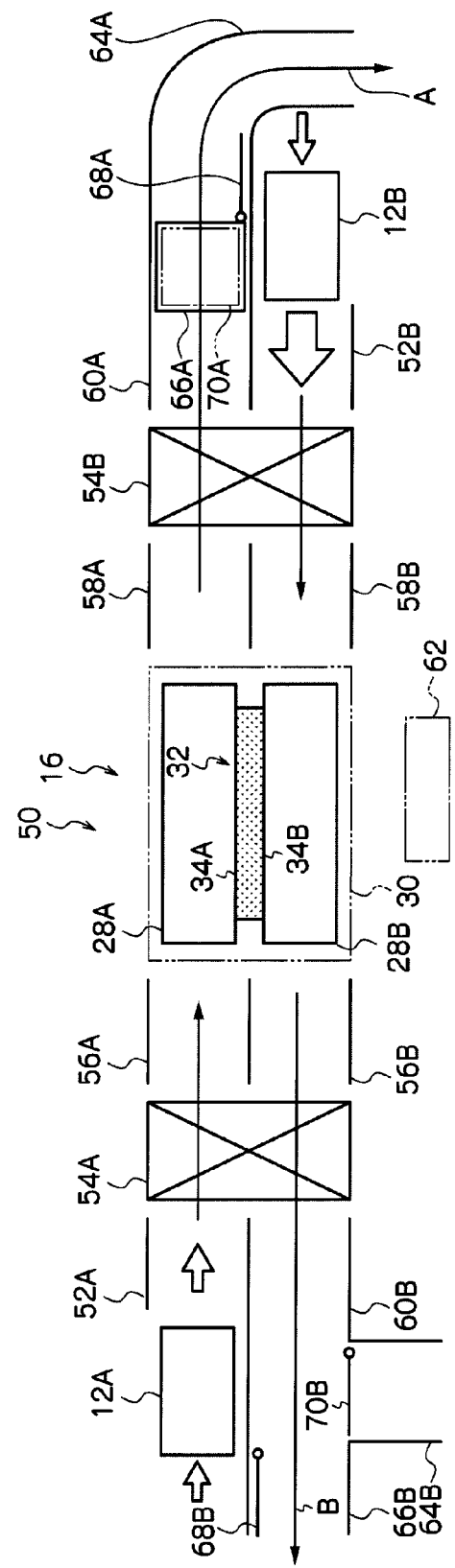

FIG. 16

| TARGET | HUMIDIFYING PATTERN Pa<br>TARGET Ta<br>(ABSOLUTE HUMIDITY 11g/Kg) | HUMIDIFYING PATTERN Pb<br>TARGET Tb<br>(ABSOLUTE HUMIDITY 9g/Kg) | HUMIDIFYING PATTERN Pc<br>TARGET Tc<br>(ABSOLUTE HUMIDITY 7g/Kg) |
|---|---|---|---|
| HUMIDIFYING AMOUNT | LARGE | INTERMEDIATE | SMALL |
| INTERVAL OF INTERMITTENT SPRAYING OF MOISTURE | SHORT | INTERMEDIATE | LONG |

(ASSUMING 5g/kg BEFORE HUMIDIFICATION)

VEHICLE HUMIDIFYING/DEHUMIDIFYING DEVICE WITH AN INTERMITTENT HUMIDIFYING AMOUNT INCREASING COMPONENT

CROSS-REFERENCE TO RELATED APPLICATIONS

This application is a national phase application of International Application No. PCT/JP2008/056661, filed Apr. 3, 2008, and claims the priority of Japanese Application No. 2007-100537, filed Apr. 6, 2007, the contents of both of which are incorporated herein by reference.

TECHNICAL FIELD

The present invention pertains to a vehicle humidifying/dehumidifying device and particularly relates to a vehicle humidifying/dehumidifying device provided with a configuration that is capable of humidifying a vehicle cabin.

BACKGROUND ART

As this type of vehicle humidifying/dehumidifying device, there is the following device (e.g., see patent document 1). For example, in patent document 1, there is disclosed an example of an air conditioner that is capable of blowing humidified air in a vehicle cabin. In this air conditioner, a heat conduction plate of a thermoelectric conversion module is provided with an adsorbent film, and the heat conduction plate is heated, whereby water is released from the adsorbent film, and air that has obtained this water becomes humidified air and is discharged in the vehicle cabin.

Patent Document 1: Japanese Patent Application Laid-Open Publication (JP-A) No. 2001-97038
Patent Document 2: Japanese Patent No. 2,964,679

DISCLOSURE OF THE INVENTION

Problem that the Invention is to Solve

However, in the air conditioner described in patent document 1, at the time of actuation thereof, the amount of moisture included in the humidified air is always constant. For that reason, there is room for improvement in order to provide a more comfortable vehicle cabin space for a passenger.

The present invention has been made in view of the above-described circumstances, and it is an object thereof to provide a vehicle humidifying/dehumidifying device that is capable of providing a more comfortable vehicle cabin space for a passenger.

Means for Solving the Problem

In order to solve this problem, a vehicle humidifying/dehumidifying device of a first aspect of the present invention comprises: a humidifying/dehumidifying unit provided with a pair of heat exchange components, each of which includes an adsorbent that is capable of adsorbing airborne moisture, and a heating component for heating the pair of heat exchange components, the humidifying/dehumidifying unit configured to generate humidified air and dehumidified air from air that has been introduced to the pair of heat exchange components; a humidifying flow path for blowing out, to a first region including a passenger region in a vehicle cabin, the humidified air that has been generated by the humidifying/dehumidifying unit; a dehumidifying flow path for blowing out, to a second region different from the first region, the dehumidified air that has been generated by the humidifying/dehumidifying unit; a switching component for switching communicated states between the heat exchange components of the humidifying/dehumidifying unit and the humidifying flow path and the dehumidifying flow path; a blowing component for forming airflows that blow out from the humidifying flow path and the dehumidifying flow path via the heat exchange components of the humidifying/dehumidifying unit; and a humidifying amount increasing component which, when the vehicle humidifying/dehumidifying device is switched from a normal mode to a humidifying amount increasing mode, increases the humidifying amount imparted to the humidified air when the humidified air is generated by the humidifying/dehumidifying unit, to more than that of the normal mode.

In the vehicle humidifying/dehumidifying device of the first aspect of the present invention, when the blowing component actuates, airflows that blow out from the humidifying flow path and the dehumidifying flow path via the heat exchange components of the humidifying/dehumidifying unit are generated. In the humidifying/dehumidifying unit, dehumidified air is generated as a result of airborne moisture that has been introduced to the heat exchange components being adsorbed by the adsorbent, and, on the other hand, humidified air is generated as a result of the heat exchange components being heated by the heating component and water being released from the adsorbent into air that has been introduced to the heat exchange components. The communicated states between the heat exchange components of the humidifying/dehumidifying unit and the humidifying flow path and the dehumidifying flow path are switched by the switching component such that the humidified air that has been generated by the humidifying/dehumidifying unit is blown out to the first region including a passenger in the vehicle cabin via the humidifying flow path and the dehumidified air that has been generated by the humidifying/dehumidifying unit is blown out to the second region different from the first region via the dehumidifying flow path.

Here, in the vehicle humidifying/dehumidifying device of the first aspect of the invention, when the vehicle humidifying/dehumidifying device is switched from the normal mode to the humidifying amount increasing mode, the humidifying amount imparted to the humidified air when the humidified air is generated by the humidifying/dehumidifying unit is increased in comparison to the case of the normal mode by the action of the humidifying amount increasing component. Thus, it becomes possible to perform humidifying amount control corresponding to various situations in the vehicle cabin, and it becomes possible to provide a more comfortable vehicle cabin space for the passenger.

In the vehicle humidifying/dehumidifying device of the first aspect of the present invention, it is preferred that the humidifying amount increasing component is provided with an air introduction amount adjusting component for adjusting the amount of air introduced to the heat exchange components such that the amount of air introduced to the heat exchange components that are unheated becomes larger than the amount of air introduced to the heat exchange components that are being heated by the heating component.

In this vehicle humidifying/dehumidifying device, air that has been introduced to the heat exchange components that are unheated has its water adsorbed by the adsorbent and becomes dehumidified air, and air that has been introduced to the heat exchange components that are being heated obtains water released from the adsorbent and becomes humidified air. Additionally, the heat exchange components are switched between a heated state and an unheated state, whereby the humidified air and the dehumidified air are generated from the humidifying/dehumidifying unit.

Here, the humidifying amount increasing component is provided with the air introduction amount adjusting component for adjusting the amount of air introduced to the heat exchange components, and the air introduction amount adjusting component adjusts the amount of air introduced to the heat exchange components such that the amount of air introduced to the heat exchange components that are unheated becomes larger than the amount of air introduced to the heat exchange components that are being heated by the heating component. Consequently, when the heat exchange components are unheated without being heated by the heating component, water can be adsorbed from more air by the adsorbent because the amount of air introduced is large. For this reason, when the heat exchange components are being heated by the heating component thereafter, more water can be released to the introduced air from the adsorbent. Moreover, a smaller amount of air is introduced to the heat exchange components when the heat exchange components are being heated than when the heat exchange components are unheated. Thus, when the vehicle humidifying/dehumidifying device is switched from the normal mode to the humidifying amount increasing mode, it becomes possible to reliably increase, in comparison to the case of the normal mode, the humidifying amount imparted to the humidified air when the humidified air is generated by the humidifying/dehumidifying unit.

Moreover, in the vehicle humidifying/dehumidifying device, it is preferred that the air introduction amount adjusting component is provided with a blowing amount adjusting component for adjusting the blowing amount of the blowing component such that the blowing amount that the blowing component blows to the heat exchange components that are unheated becomes larger than the blowing amount that the blowing component blows to the heat exchange components that are being heated by the heating component.

In this vehicle humidifying/dehumidifying device, the air introduction amount adjusting component is provided with the blowing amount adjusting component for adjusting the blowing amount of the blowing component, and the blowing amount adjusting component adjusts the blowing amount of the blowing component such that the blowing amount that the blowing component blows to the heat exchange components that are unheated becomes larger than the blowing amount that the blowing component blows to the heat exchange components that are being heated by the heating component. Thus, it becomes possible to adjust the amount of air introduced to the heat exchange components such that the amount of air introduced to the heat exchange components that are unheated becomes larger than the amount of air introduced to the heat exchange components that are being heated by the heating component.

Further, in the vehicle humidifying/dehumidifying device, it is preferred that the air introduction amount adjusting component is provided with a blowing ratio changing component that is disposed between the blowing component and the pair of heat exchange components and is capable of operating so as to change the ratio of air blown from the blowing component to the pair of heat exchange components and a blowing ratio control component for controlling operation of the blowing ratio changing component such that the blowing amount blown from the blowing component to the heat exchange component of the pair of heat exchange components that is unheated becomes larger than the blowing amount blown from the blowing component to the heat exchange component of the pair of heat exchange components that is being heated by the heating component.

In this vehicle humidifying/dehumidifying device, the air introduction amount adjusting component is provided with the blowing ratio changing component that is disposed between the blowing component and the pair of heat exchange components and is capable of operating so as to change the ratio of air blown from the blowing component to the pair of heat exchange components, and the blowing ratio control component controls operation of this blowing ratio changing component to adjust the ratio of air blown from the blowing component to the pair of heat exchange components such that the blowing amount blown from the blowing component to the heat exchange component of the pair of heat exchange components that is unheated becomes larger than the blowing amount blown from the blowing component to the heat exchange component of the pair of heat exchange components that is being heated. Thus, it becomes possible to adjust the amount of air introduced to the pair of heat exchange components such that the amount of air introduced to the heat exchange component of the pair of heat exchange components that is unheated becomes larger than the amount of air introduced to the heat exchange component of the pair of heat exchange components that is being heated.

Further, in the vehicle humidifying/dehumidifying device, it is preferred that the humidifying amount increasing component is provided with a heating control component that controls the heating component such that the heating component simultaneously and intermittently heats the pair of heat exchange components.

In this vehicle humidifying/dehumidifying device, the pair of heat exchange components are heated simultaneously and intermittently by the heating component. At this time, when the pair of heat exchange components are not being heated by the heating component, air that has been introduced to the heat exchange components has its water adsorbed by the adsorbent and becomes dehumidified air, and when the pair of heat exchange components are being heated by the heating component, air that has been introduced to the heat exchange components obtains water released from the adsorbent and becomes humidified air. Additionally, the simultaneous and intermittent heating of the pair of heat exchange components by the heating component is repeated, whereby the humidified air and the dehumidified air are alternately continuously generated from the humidifying/dehumidifying unit.

Here, the humidifying amount increasing component is configured to be a heating control component that controls the heating component such that the heating component simultaneously and intermittently heats the pair of heat exchange components. Consequently, when the pair of heat exchange components are being heated simultaneously by the heating component, humidified air can be generated by both of the pair of heat exchange components. Thus, when the vehicle humidifying/dehumidifying device is switched from the normal mode to the humidifying amount increasing mode, it becomes possible to reliably increase, in comparison to the case of the normal mode, the humidifying amount imparted to the humidified air when the humidified air is generated by the humidifying/dehumidifying unit.

Further, in the vehicle humidifying/dehumidifying device, it is preferred that the heating component is provided with a first heating component for alternately heating the pair of heat exchange components and a second heating component for simultaneously heating the pair of heat exchange components.

In this vehicle humidifying/dehumidifying device, the heating component is provided with the first heating component for alternately heating the pair of heat exchange components and the second heating component for simultaneously heating the pair of heat exchange components. Thus, the heat exchange components can be heated in various patterns, and it becomes possible to perform finer humidifying amount control corresponding to various situations in the vehicle cabin.

Effects of the Invention

As described in detail above, according to the present invention, when the vehicle humidifying/dehumidifying device is switched from the normal mode to the humidifying amount increasing mode, the humidifying amount imparted to the humidified air when the humidified air is generated by the humidifying/dehumidifying unit is increased in comparison to the case of the normal mode by the action of the humidifying amount increasing component. Thus, it becomes possible to perform humidifying amount control corresponding to various situations in the vehicle cabin, and it becomes possible to provide a more comfortable vehicle cabin space for the passenger.

BRIEF DESCRIPTION OF THE DRAWINGS

[FIG. 2] A side view showing the overall configuration of the vehicle humidifying/dehumidifying device pertaining to the first embodiment of the present invention.

[FIG. 3] A plan view showing the overall configuration of the vehicle humidifying/dehumidifying device pertaining to the first embodiment of the present invention.

[FIG. 4A] An explanatory view showing an operating state during a continuous operation mode of the vehicle humidifying/dehumidifying device pertaining to the first embodiment of the present invention.

[FIG. 4B] An explanatory view showing an operating state during the continuous operation mode of the vehicle humidifying/dehumidifying device pertaining to the first embodiment of the present invention.

[FIG. 5A] An explanatory view showing an operating state during an intermittent operation mode of the vehicle humidifying/dehumidifying device pertaining to the first embodiment of the present invention.

[FIG. 5B] An explanatory view showing an operating state during the intermittent operation mode of the vehicle humidifying/dehumidifying device pertaining to the first embodiment of the present invention.

[FIG. 6B] An explanatory view showing an operating state during the high-humidity operation mode of the vehicle humidifying/dehumidifying device pertaining to the first embodiment of the present invention.

[FIG. 7A] A view showing a first modification of the vehicle humidifying/dehumidifying device pertaining to the first embodiment of the present invention.

[FIG. 7B] A view showing the first modification of the vehicle humidifying/dehumidifying device pertaining to the first embodiment of the present invention.

[FIG. 8] A view showing a second modification of the vehicle humidifying/dehumidifying device pertaining to the first embodiment of the present invention.

[FIG. 9] A view showing a third modification of the vehicle humidifying/dehumidifying device pertaining to the first embodiment of the present invention.

[FIG. 10A] A view (a side view) showing the overall configuration of a vehicle humidifying/dehumidifying device pertaining to a second embodiment of the present invention.

[FIG. 10B] A view (enlarged plan view of relevant portions) showing the overall configuration of the vehicle humidifying/dehumidifying device pertaining to the second embodiment of the present invention.

[FIG. 11A] An explanatory view showing an operating state during a continuous operation mode of the vehicle humidifying/dehumidifying device pertaining to the second embodiment of the present invention.

[FIG. 11B] An explanatory view showing an operating state during the continuous operation mode of the vehicle humidifying/dehumidifying device pertaining to the second embodiment of the present invention.

[FIG. 13A] An explanatory view showing an operating state during a high-humidity operation mode of the vehicle humidifying/dehumidifying device pertaining to the second embodiment of the present invention.

[FIG. 16] An explanatory view showing the content of information that has been digitized and stored in a control unit shown in FIG. 14.

BEST MODES FOR IMPLEMENTING THE INVENTION

[First Embodiment]

To begin, the configuration of a vehicle humidifying/dehumidifying device 10 pertaining to a first embodiment of the present invention will be described.

Figure 1:
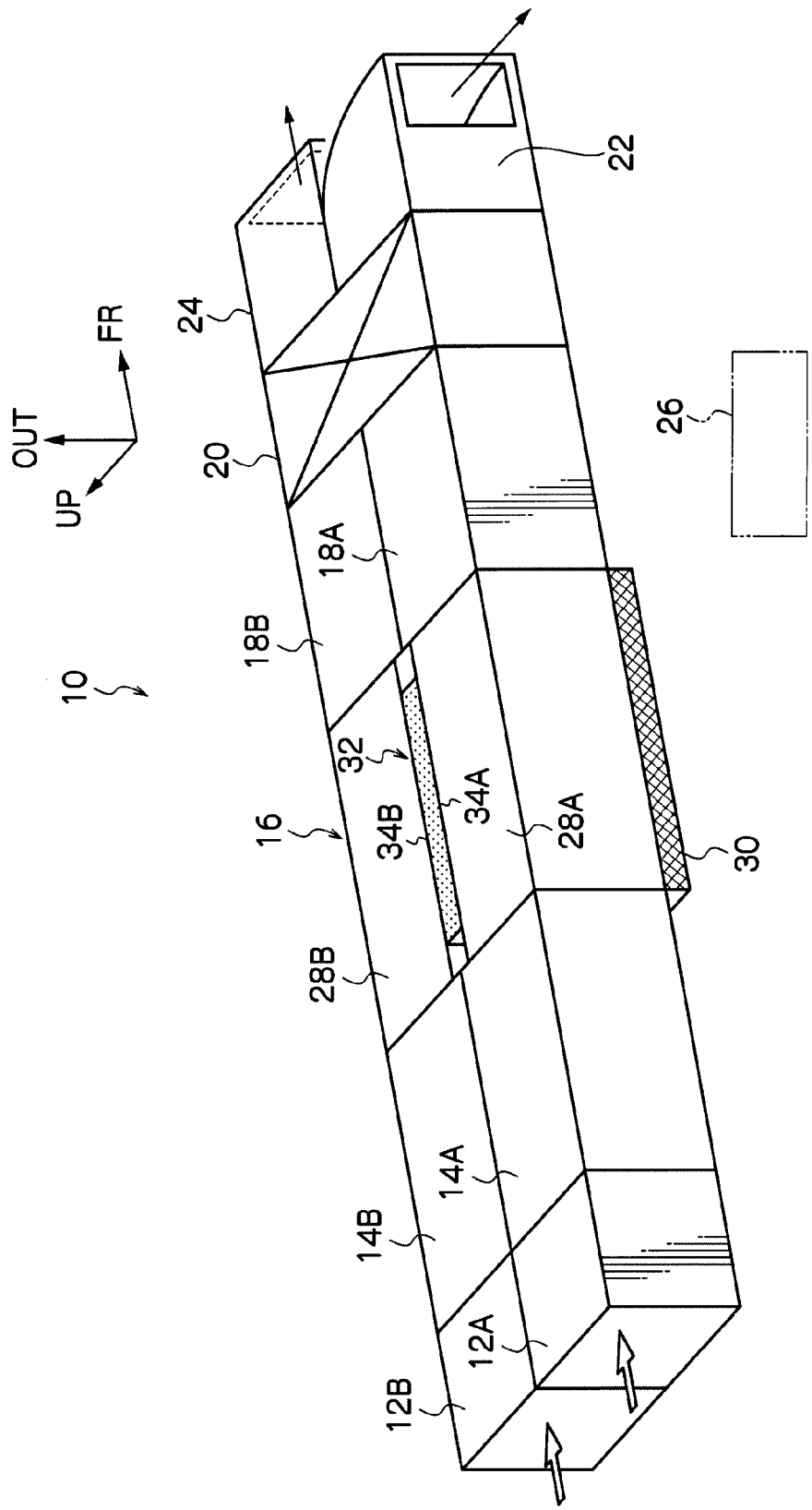
[FIG. 1] A perspective view showing the overall configuration of a vehicle humidifying/dehumidifying device pertaining to a first embodiment of the present invention.

In FIG. 1 to FIG. 3, there is shown the overall configuration of the vehicle humidifying/dehumidifying device 10 pertaining to the first embodiment of the present invention. It will be noted that arrow FR, arrow OUT and arrow UP shown in the drawings respectively represent a vehicle longitudinal direction front side, a vehicle width direction outer side and a vehicle vertical direction upper side when the vehicle humidifying/dehumidifying device 10 is installed in a vehicle.

As shown in these drawings, the vehicle humidifying/dehumidifying device 10 pertaining to the first embodiment of the present invention has, as its main configuration, a pair of blowers 12A and 12B (blowing components), a pair of connecting flow paths 14A and 14B, a humidifying/dehumidifying unit 16, a pair of connecting flow paths 18A and 18B, a switching damper 20 (switching component), a humidifying flow path 22, a dehumidifying flow path 24, and a control unit 26 (humidifying amount increasing component, air introduction amount adjusting component, blowing amount adjusting component, blowing ratio control component, heating control component). These will described below in this order.

The pair of blowers 12A and 12B are configured by electrically powered fan motors or the like, for example. The pair of blowers 12A and 12B are configured to start up when actuation signals from the control unit 26 are inputted thereto, suck in air outside of the vehicle humidifying/dehumidifying device 10, and blow the air toward the later-described pair of connecting flow paths 14A and 14B. Further, the pair of blowers 12A and 12B are configured such that their numbers of rotations, for example, are changed in response to actuation signals from the later-described control unit 26 so as to be capable of adjusting the blowing amounts that the blowers 12A and 12B blow toward the pair of connecting flow paths 14A and 14B.

The pair of connecting flow paths 14A and 14B are respectively configured by hollow bodies and are given a configuration where they respectively communicate the pair of blowers 12A and 12B and heat exchange elements 28A and 28B that are disposed in the later-described humidifying/dehumidifying unit 16.

The humidifying/dehumidifying unit 16 is configured to include a pair of heat exchange elements 28A and 28B (heat exchange components) and a heater 30 and Peltier element 32 (heating component).

The pair of heat exchange elements 28A and 28B are configured such that the air that has been blown from the pair of connecting flow paths 14A and 14B is capable of passing through the insides of the heat exchange elements 28A and 28B and are configured such that an adsorbent that is capable of adsorbing airborne moisture is applied to surface portions of passages through which the air passes.

The heater 30 is attached across the pair of heat exchange elements 28A and 28B so as to cover their entire back surfaces and is configured such that the heater 30 can simultaneously heat the pair of heat exchange elements 28A and 28B when the heater 30 has been placed in an actuated state in response to an actuation signal from the later-described control unit 26.

The Peltier element 32 is inserted between side surfaces of the pair of heat exchange elements 28A and 28B, with one planar portion 34A of the Peltier element 32 being attached to the side surface portion of the one heat exchange element 28A and another planar portion 34B of the Peltier element 32 being attached to the side surface portion of the other heat exchange element 28B. The Peltier element 32 is configured such that it can switch between heat emission (hot temperature) and heat absorption (low temperature) of both of the planar portions 34A and 34B in response to an actuation signal (polarity of applied voltage) from the later-described control unit 26. Additionally, the Peltier element 32 is configured such that it can, by switching between heat emission and heat absorption of both of the planar portions 34A and 34B, switch between a state where it heats one of the pair of heat exchange elements 28A and 28B and cools the other and a state where it cools one of the pair of heat exchange elements 28A and 28B and heats the other.

The pair of connecting flow paths 18A and 18B are respectively configured by hollow bodies and are given a configuration where they respectively communicate the heat exchange elements 28A and 28B of the humidifying/dehumidifying unit 16 and the later-described switching damper 20.

The switching damper 20 includes a drive component and is given a configuration which, by the driving of this drive component, can switch the communicated flow paths between the pair of connecting flow paths 18A and 18B and the later-described humidifying flow path 22 and dehumidifying flow path 24. In other words, the switching damper 20 is configured to be capable of switching between a communicated state where it communicates the one connecting flow path 18A and the humidifying flow path 22 and communicates the other connecting flow path 18B and the dehumidifying flow path 24, a communicated state where it communicates the one connecting flow path 18A and the dehumidifying flow path 24 and communicates the other connecting flow path 18B and the humidifying flow path 22, a communicated state where it communicates the pair of connecting flow paths 18A and 18B and the humidifying flow path 22, and a communicated state where it communicates the pair of connecting flow paths 18A and 18B and the dehumidifying flow path 24. Further, the switching damper 20 is configured to actuate and switch between the communicated states in response to an actuation signal from the later-described control unit 26.

The humidifying flow path 22 and the dehumidifying flow path 24 are configured by ventilation ducts or the like, for example. The humidifying flow path 22 is used to blow out, toward a passenger in a vehicle cabin (first region), for example, the air that has been blown from the switching damper 20. The dehumidifying flow path 24 is used to blow out, toward a surface of a front window on the vehicle cabin side (second region), for example, the air that has been blown from the switching damper 20.

The control unit 26 is configured by an electrical circuit disposed with a CPU, a ROM and a RAM, for example, and is configured such that it can control operation of the pair of blowers 12A and 12B, the heater 30, the Peltier element 32 and the damper 20 in response to, for example, a control signal from an external control device (e.g., a main control unit or an operation panel) or a detection signal from a sensor that detects the situation in the vehicle cabin. It will be noted that specific operation of the control unit 26 will be described in conjunction with operation of the device overall below.

Next, operation and the action and effects of the vehicle humidifying/dehumidifying device 10 pertaining to the first embodiment of the present invention will be described.

The control unit 26 switches to a "continuous operation mode", an "intermittent operation mode" or a "high-humidity operation mode" in response to, for example, a control signal from an external control device (e.g., a main control unit or an operation panel) or a detection signal from a sensor that detects the situation in the vehicle cabin, and when the control unit 26 is switched to the modes, the control unit 26 controls operation of the pair of blowers 12A and 12B, the heater 30, the Peltier element 32 and the switching damper 20 as described below.

In FIG. 4 to FIG. 6, there are respectively shown operating states of the vehicle humidifying/dehumidifying device 10 overall when the control unit 26 is switched to the "continuous operation mode", the "intermittent operation mode" and the "high-humidity operation mode". It will be noted that, in the present embodiment, the "continuous operation mode" is configured to be a normal mode pertaining to the present invention and that the "intermittent operation mode" and the "high-humidity operation mode" are configured to be a humidifying amount increasing mode pertaining to the present invention.

(Continuous Operation Mode)

First, the operating state of the vehicle humidifying/dehumidifying device 10 overall when the control unit 26 is switched to the "continuous operation mode" will be described on the basis of FIG. 4.

When the control unit 26 is switched to the "continuous operation mode", the control unit 26 outputs an actuation signal to the Peltier element 32 to actuate the Peltier element 32 such that the one planar portion 34A of the Peltier element 32 emits heat and the other planar portion 34B of the Peltier element 32 absorbs heat.

Further, the control unit 26 outputs an actuation signal to the switching damper 20 to switch the switching damper 20 to the communicated state where the one connecting flow path 18A and the humidifying flow path 22 are communicated and where the other connecting flow path 18B and the dehumidifying flow path 24 are communicated.

Then, the control unit 26 actuates the pair of blowers 12A and 12B. At this time, the control unit 26 ensures that the blowing amounts of the pair of blowers 12A and 12B become the same (blowing amounts 1:1).

Thus, as shown in FIG. 4A, the air that has been blown from the pair of blowers 12A and 12B is introduced to the heat exchange elements 28A and 28B of the humidifying/dehumidifying unit 16 via the pair of connecting flow paths 14A and 14B. The air that has been introduced to the one heat exchange element 28A obtains water released from the adsorbent of the heat exchange element 28A and becomes humidified air when the air passes through the inside of the heat exchange element 28A because the heat exchange element 28A is being heated by the Peltier element 32. The air that has been introduced to the other heat exchange element 28B has its water adsorbed by the adsorbent of the heat exchange element 28B and becomes dehumidified air when the air passes through the inside of the heat exchange element 28B because the heat exchange element 28B is being cooled by the Peltier element 32.

Further, the humidified air and the dehumidified air that have been generated by the humidifying/dehumidifying unit 16 in this manner are respectively blown to the switching damper 20 via the pair of connecting flow paths 18A and 18B and are respectively guided to the humidifying flow path 22 and the dehumidifying flow path 24 by the switching damper 20. Then, the humidified air (arrow A) is blown out toward the passenger in the vehicle cabin (first region), for example, from the humidifying flow path 22, and the dehumidified air (arrow B) is blown out toward the surface of the front window on the vehicle cabin side (second region), for example, from the dehumidifying flow path 24.

Further, the control unit 26 switches as described next when a certain amount of time (e.g., an amount of time when it is predicted that the adsorbent of the heat exchange element 28A will reach a state where it has released all of its water or that the adsorbent of the heat exchange element 28B will reach a water-saturated state; for example, several minutes) has elapsed after the start of operation of the continuous operation mode.

In other words, the control unit 26 outputs an actuation signal to the Peltier element 32 to actuate the Peltier element 32 such that the one planar portion 34A of the Peltier element 32 absorbs heat and the other planar portion 34B of the Peltier element 32 emits heat.

Further, the control unit 26 outputs an actuation signal to the switching damper 20 to switch the switching damper 20 to the communicated state where the one connecting flow path 18A and the dehumidifying flow path 24 are communicated and where the other connecting flow path 18B and the humidifying flow path 22 are communicated.

Thus, as shown in FIG. 4B, the air that has been blown from the pair of blowers 12A and 12B is introduced to the heat exchange elements 28A and 28B of the humidifying/dehumidifying unit 16 via the pair of connecting flow paths 14A and 14B. The air that has been introduced to the one heat exchange element 28A has its water adsorbed by the adsorbent of the heat exchange element 28A and becomes dehumidified air when the air passes through the inside of the heat exchange element 28A because the heat exchange element 28A is being cooled by the Peltier element 32. The air that has been introduced to the other heat exchange element 28B obtains water released from the adsorbent of the heat exchange element 28B and becomes humidified air when the air passes through the inside of the heat exchange element 28B because the heat exchange element 28B is being heated by the Peltier element 32.

Further, the humidified air and the dehumidified air that have been generated by the humidifying/dehumidifying unit 16 in this manner are respectively blown to the switching damper 20 via the pair of connecting flow paths 18A and 18B and are respectively guided to the humidifying flow path 22 and the dehumidifying flow path 24 by the switching damper 20. Then, the humidified air (arrow A) is blown out toward the passenger in the vehicle cabin (first region), for example, from the humidifying flow path 22, and the dehumidified air (arrow B) is blown out toward the surface of the front window on the vehicle cabin side (second region), for example, from the dehumidifying flow path 24.

Further, the control unit 26 again switches the Peltier element 32 and the switching damper 20 (see FIG. 4A) when a certain amount of time (e.g., an amount of time when it is predicted that the adsorbent of the heat exchange element 28A will reach a water-saturated state or that the adsorbent of the heat exchange element 28B will reach a state where it has released all of its water; for example, several minutes) has elapsed after the aforementioned switching operation.

Then, the control unit 26 repeats the above-described operations (the operation of FIG. 4A and the operation of FIG. 4B) until the control unit 26 ends the "continuous operation mode" in response to, for example, a control signal from an external control device (e.g., a main control unit or an operation panel) or a detection signal from a sensor that detects the situation in the vehicle cabin. Thus, the humidified air (arrow A) and the dehumidified air (arrow B) are continuously blown out from the vehicle humidifying/dehumidifying device 10. It will be noted that, at this time, a water amount of 2 to 3 g/m$^3$ can be supplied to the passenger.

In this manner, in the vehicle humidifying/dehumidifying device 10 pertaining to the first embodiment of the present invention, when the control unit 26 is switched to the "continuous operation mode", humidified air and dehumidified air are simultaneously continuously blown out. Thus, moisture is supplied to the passenger so that a comfortable vehicle cabin space can be provided, and fogging of the front window can be reliably prevented.

(Intermittent Operation Mode)

Next, the operating state of the vehicle humidifying/dehumidifying device 10 overall when the control unit 26 is switched to the "intermittent operation mode" will be described on the basis of FIG. 5.

When the control unit 26 is switched to the "intermittent operation mode", the control unit 26 outputs an actuation signal to the switching damper 20 to switch the switching damper 20 to the communicated state where the pair of connecting flow paths 18A and 18B and the dehumidifying flow path 24 are communicated.

Then, the control unit 26 actuates the pair of blowers 12A and 12B. At this time, the control unit 26 ensures that the blowing amounts of the pair of blowers 12A and 12B become the same (blowing amounts 1:1).

Thus, as shown in FIG. 5A, the air that has been blown from the pair of blowers 12A and 12B is introduced to the heat exchange elements 28A and 28B of the humidifying/dehumidifying unit 16 via the pair of connecting flow paths 14A and 14B. The air that has been introduced to the heat exchange elements 28A and 28B has its water adsorbed by the adsorbents of the heat exchange elements 28A and 28B and becomes dehumidified air when the air passes through the insides of the heat exchange elements 28A and 28B because the heat exchange elements 28A and 28B are not being heated by the heater 30 and the Peltier element 32.

Further, the dehumidified air that has been generated by the humidifying/dehumidifying unit 16 in this manner is blown to the switching damper 20 via the pair of connecting flow paths 18A and 18B and is guided to the dehumidifying flow path 24 by the switching damper 20. Then, the dehumidified air (arrow B) is blown out toward the surface of the front window on the vehicle cabin side (second region), for example, from the dehumidifying flow path 24.

Further, the control unit 26 switches as described next when a certain amount of time (e.g., an amount of time when it is predicted that the adsorbents of the heat exchange elements 28A and 28B will reach a water-saturated state; for example, several minutes) has elapsed after the start of operation of the intermittent operation mode.

In other words, the control unit 26 outputs an actuation signal to the heater 30 to actuate the heater 30. Further, the control unit 26 outputs an actuation signal to the switching damper 20 to switch the switching damper 20 to the communicated state where the pair of connecting flow paths 18A and 18B and the humidifying flow path 22 are communicated.

Thus, as shown in FIG. 5B, the air that has been blown from the pair of blowers 12A and 12B is introduced to the heat exchange elements 28A and 28B of the humidifying/dehumidifying unit 16 via the pair of connecting flow paths 14A and 14B. The air that has been introduced to the heat exchange elements 28A and 28B obtains water released from the adsorbents of the heat exchange elements 28A and 28B and becomes humidified air when the air passes through the insides of the heat exchange elements 28A and 28B because the heat exchange elements 28A and 28B are being heated by the heater 30.

Further, the humidified air that has been generated by the humidifying/dehumidifying unit 16 in this manner is blown to the switching damper 20 via the pair of connecting flow paths 18A and 18B and is guided to the humidifying flow path 22 by the switching damper 20. Then, the humidified air (arrow A) is blown out toward the passenger in the vehicle cabin (first region), for example, from the humidifying flow path 22.

Further, the control unit 26 again switches the Peltier element 32 and the switching damper 20 (see FIG. 5A) when a certain amount of time (e.g., an amount of time when it is predicted that the adsorbents of the heat exchange elements 28A and 28B will reach a state where they have released all of their water; for example, several minutes) has elapsed after the aforementioned switching operation.

Then, the control unit 26 repeats the above-described operations (the operation of FIG. 5A and the operation of FIG. 5B) until the control unit 26 ends the "intermittent operation mode" in response to, for example, a control signal from an external control device (e.g., a main control unit or an operation panel) or a detection signal from a sensor that detects the situation in the vehicle cabin. Thus, the humidified air (arrow A) and the dehumidified air (arrow B) are alternately continuously blown out from the vehicle humidifying/dehumidifying device 10.

In this manner, in the vehicle humidifying/dehumidifying device 10 pertaining to the first embodiment of the present invention, when the control unit 26 is switched to the "intermittent operation mode", the pair of heat exchange elements 28A and 28B are heated simultaneously and intermittently. Additionally, this allows humidified air to be generated by both of the pair of heat exchange elements 28A and 28B when the pair of heat exchange elements 28A and 28B are being heated simultaneously by the heater 30. Consequently, in comparison to a case where the humidified air is generated alternately by the heat exchange elements 28A and 28B as in the continuous operation mode (see FIG. 4), the humidifying amount when the humidified air is generated by the humidifying/dehumidifying unit 16 can be increased.

Thus, it becomes possible to perform humidifying amount control corresponding to various situations in the vehicle cabin, and it becomes possible to provide a more comfortable vehicle cabin space for the passenger.

Further, according to the vehicle humidifying/dehumidifying device 10 pertaining to the first embodiment of the present invention, more water can be supplied to the passenger as a result of the vehicle humidifying/dehumidifying device 10 performing intermittent operation as described above in the vehicle cabin whose water amount is limited.

(High-Humidity Operation Mode)

Next, the operating state of the vehicle humidifying/dehumidifying device 10 overall when the control unit 26 is switched to the "high-humidity operation mode" will be described on the basis of FIG. 6.

When the control unit 26 is switched to the "high-humidity operation mode", the control unit 26 outputs an actuation signal to the Peltier element 32 to actuate the Peltier element 32 such that the one planar portion 34A of the Peltier element 32 emits heat and the other planar portion 34B of the Peltier element 32 absorbs heat.

Further, the control unit 26 outputs an actuation signal to the switching damper 20 to switch the switching damper 20 to the communicated state where the one connecting flow path 18A and the humidifying flow path 22 are communicated and where the other connecting flow path 18B and the dehumidifying flow path 24 are communicated.

Then, the control unit 26 actuates the pair of blowers 12A and 12B. At this time, the control unit 26 ensures that the blowing amount of the one blower 12A becomes half the blowing amount of the other blower 12B (blowing amounts 1:2).

Figure 6A:
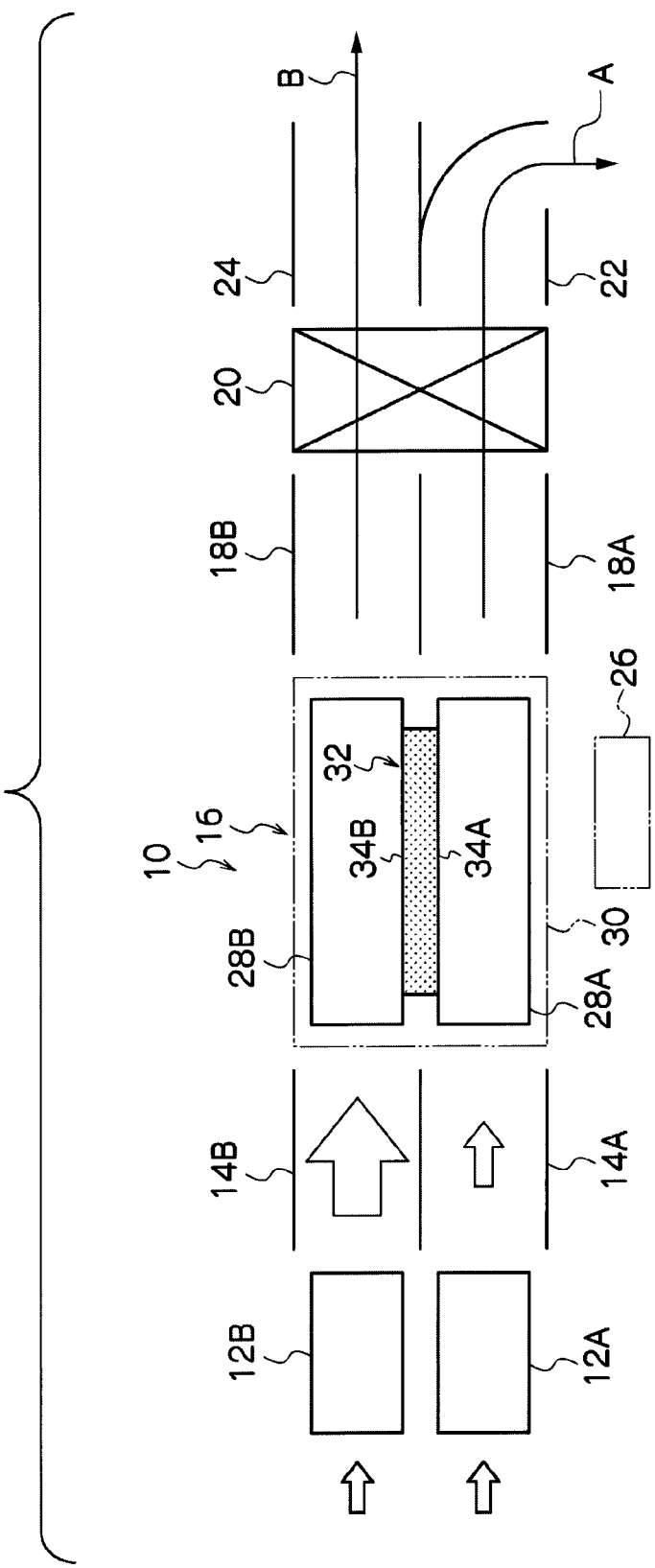
[FIG. 6A] An explanatory view showing an operating state during a high-humidity operation mode of the vehicle humidifying/dehumidifying device pertaining to the first embodiment of the present invention.

Thus, as shown in FIG. 6A, the air that has been blown from the pair of blowers 12A and 12B is introduced to the heat exchange elements 28A and 28B of the humidifying/dehumidifying unit 16 via the pair of connecting flow paths 14A and 14B. The air that has been introduced to the one heat exchange element 28A obtains water released from the adsorbent of the heat exchange element 28A and becomes humidified air when the air passes through the inside of the heat exchange element 28A because the heat exchange element 28A is being heated by the Peltier element 32. The air that has been introduced to the other heat exchange element 28B has its water adsorbed by the adsorbent of the heat exchange element 28B and becomes dehumidified air when the air passes through the inside of the heat exchange element 28B because the heat exchange element 28B is being cooled by the Peltier element 32.

Further, the humidified air and the dehumidified air that have been generated by the humidifying/dehumidifying unit 16 in this manner are respectively blown to the switching damper 20 via the pair of connecting flow paths 18A and 18B and are respectively guided to the humidifying flow path 22 and the dehumidifying flow path 24 by the switching damper 20. Then, the humidified air (arrow A) is blown out toward the passenger in the vehicle cabin (first region), for example, from the humidifying flow path 22, and the dehumidified air (arrow B) is blown out toward the surface of the front window on the vehicle cabin side (second region), for example, from the dehumidifying flow path 24.

Further, the control unit 26 switches as described next when a certain amount of time (e.g., an amount of time when it is predicted that the adsorbent of the heat exchange element 28A will reach a state where it has released all of its water or that the adsorbent of the heat exchange element 28B will reach a water-saturated state; for example, several minutes) has elapsed after the start of operation of the high-humidity operation mode.

In other words, the control unit 26 outputs an actuation signal to the Peltier element 32 to actuate the Peltier element 32 such that the one planar portion 34A of the Peltier element 32 absorbs heat and the other planar portion 34B of the Peltier element 32 emits heat.

Further, the control unit 26 outputs an actuation signal to the switching damper 20 to switch the switching damper 20 to the communicated state where the one connecting flow path 18A and the dehumidifying flow path 24 are communicated and where the other connecting flow path 18B and the humidifying flow path 22 are communicated.

Further, the control unit 26 switches the actuated states of the pair of blowers 12A and 12B to ensure that the blowing amount of the one blower 12A becomes twice the blowing amount of the other blower 12B (blowing amounts 2:1).

Thus, as shown in FIG. 6B, the air that has been blown from the pair of blowers 12A and 12B is introduced to the heat exchange elements 28A and 28B of the humidifying/dehumidifying unit 16 via the pair of connecting flow paths 14A and 14B. The air that has been introduced to the one heat exchange element 28A has its water adsorbed by the adsorbent of the heat exchange element 28A and becomes dehumidified air when the air passes through the inside of the heat exchange element 28A because the heat exchange element 28A is being cooled by the Peltier element 32. The air that has been introduced to the other heat exchange element 28B obtains water released from the adsorbent of the heat exchange element 28B and becomes humidified air when the air passes through the inside of the heat exchange element 28B because the heat exchange element 28B is being heated by the Peltier element 32.

Further, the humidified air and the dehumidified air that have been generated by the humidifying/dehumidifying unit 16 in this manner are respectively blown to the switching damper 20 via the pair of connecting flow paths 18A and 18B and are respectively guided to the humidifying flow path 22 and the dehumidifying flow path 24 by the switching damper 20. Then, the humidified air (arrow A) is blown out toward the passenger in the vehicle cabin (first region), for example, from the humidifying flow path 22, and the dehumidified air (arrow B) is blown out toward the surface of the front window on the vehicle cabin side (second region), for example, from the dehumidifying flow path 24.

Further, the control unit 26 again switches the Peltier element 32 and the switching damper 20 (see FIG. 6A) when a certain amount of time (e.g., an amount of time when it is predicted that the adsorbent of the heat exchange element 28A will reach a water-saturated state or that the adsorbent of the heat exchange element 28B will reach a state where it has released all of its water; for example, several minutes) has elapsed after the aforementioned switching operation.

Further, the control unit 26 switches the actuated states of the pair of blowers 12A and 12B to ensure that the blowing amount of the one blower 12A becomes half the blowing amount of the other blower 12B (blowing amounts 1:2).

Then, the control unit 26 repeats the above-described operations (the operation of FIG. 6A and the operation of FIG. 6B) until the control unit 26 ends the "high-humidity operation mode" in response to, for example, a control signal from an external control device (e.g., a main control unit or an operation panel) or a detection signal from a sensor that detects the situation in the vehicle cabin. Thus, the humidified air (arrow A) and the dehumidified air (arrow B) are continuously blown out from the vehicle humidifying/dehumidifying device 10.

In this manner, in the vehicle humidifying/dehumidifying device 10 pertaining to the first embodiment of the present invention, when the control unit 26 is switched to the "high-humidity operation mode", the blowing amounts of the pair of blowers 12A and 12B are adjusted such that the ratio of the blowing amount that one of the pair of blowers 12A and 12B blows to the heat exchange element of the pair of heat exchange elements 28A and 28B that is unheated to the blowing amount that the other of the pair of blowers 12A and 12B blows to the heat exchange element of the pair of heat exchange elements 28A and 28B that is being heated becomes 2:1. For this reason, the amount of air introduced to the heat exchange element of the pair of heat exchange elements 28A and 28B that is unheated becomes larger than the amount of air introduced to the heat exchange element of the pair of heat exchange elements 28A and 28B that is being heated.

Consequently, when the heat exchange elements 28A and 28B are switched to heat exchange elements that are unheated without being heated by the Peltier element 32, water can be adsorbed from more air by the adsorbent because the amount of air introduced is large. For this reason, when the heat exchange elements 28A and 28B are switched to heat exchange elements that are being heated by the Peltier element 32 thereafter, more water can be released to the introduced air from the adsorbent. Moreover, a smaller amount of air is introduced to the heat exchange element of the pair of heat exchange elements 28A and 28B that is being heated than to the heat exchange element that is unheated. Thus, in comparison to the case of the continuous operation mode (see FIG. 4), the humidifying amount per unit quantity of the humidified air (absolute humidity of humidified air) when the humidified air is generated by the humidifying/dehumidifying unit 16 can be increased. It will be noted that, at this time, a water amount of 4 to 6 g/m$^3$ can be supplied to the passenger.

Thus, it becomes possible to perform humidifying amount control corresponding to various situations in the vehicle cabin, and it becomes possible to provide a more comfortable vehicle cabin space for the passenger.

Further, according to the vehicle humidifying/dehumidifying device 10 pertaining to the first embodiment of the present invention, more water can be supplied to the passenger as a result of the vehicle humidifying/dehumidifying device 10 performing high-humidity operation as described above in the vehicle cabin whose water amount is limited.

Next, modifications of the vehicle humidifying/dehumidifying device 10 pertaining to the first embodiment of the present invention will be described.

The vehicle humidifying/dehumidifying device 10 may be modified as shown in FIG. 7 to FIG. 9, for example. In FIG. 7 to FIG. 9, there are respectively shown modifications of the vehicle humidifying/dehumidifying device 10 pertaining to the first embodiment of the present invention.

(First Modification)

In a first modification shown in FIG. 7, one blower 12 and one connecting flow path 14 are disposed instead of the pair of blowers 12A and 12B and the pair of connecting flow paths 14A and 14B shown in FIG. 1. Further, an adjusting damper 36 (humidifying amount increasing component, air introduction amount adjusting component, blowing ratio control component) is disposed so as to vertically partition the flow path in correspondence to the backflow side flow path. The adjusting damper 36 includes a drive component and is given a configuration which, by the driving of this drive component, is capable of adjusting the ratio of air blown from the blower 12 to the heat exchange elements 28A and 28B.

Additionally, in this configuration, when the control unit 26 is switched to the "high-humidity operation mode", the control unit 26 actuates the adjusting damper 36 such that the ratio of the blowing amount blown to the heat exchange element of the pair of heat exchange elements 28A and 28B that is unheated to the blowing amount blown to the heat exchange element of the pair of heat exchange elements 28A and 28B that is being heated becomes 2:1.

In other words, the adjusting damper 36 is, in FIG. 7A, adjusted such that the ratio of the blowing amount blown to the heat exchange element 28B, which is unheated, of the pair of heat exchange elements 28A and 28B to the blowing amount blown to the heat exchange element 28A, which is heated, of the pair of heat exchange elements 28A and 28B becomes 2:1, and the adjusting damper 36 is, in FIG. 7B, adjusted such that the ratio of the blowing amount blown to the heat exchange element 28A, which is unheated, of the pair of heat exchange elements 28A and 28B to the blowing amount blown to the heat exchange element 28B, which is heated, of the pair of heat exchange elements 28A and 28B becomes 2:1. Thus, the amount of air introduced to the heat exchange element of the pair of heat exchange elements 28A and 28B that is unheated becomes larger than the amount of air introduced to the heat exchange element of the pair of heat exchange elements 28A and 28B that is being heated.

Consequently, when the heat exchange elements 28A and 28B are switched to heat exchange elements that are unheated without being heated by the Peltier element 32, water can be adsorbed from more air by the adsorbent because the amount of air introduced is large. For this reason, when the heat exchange elements 28A and 28B are switched to heat exchange elements that are being heated by the Peltier element 32 thereafter, more water can be released to the introduced air from the adsorbent. Moreover, a smaller amount of air is introduced to the heat exchange element of the pair of heat exchange elements 28A and 28B that is being heated than to the heat exchange element that is unheated. Thus, the humidifying amount per unit quantity of the humidified air (absolute humidity of humidified air) when the humidified air is generated by the humidifying/dehumidifying unit 16 can be increased.

Thus, it becomes possible to perform humidifying amount control corresponding to various situations in the vehicle cabin, and it becomes possible to provide a more comfortable vehicle cabin space for the passenger.

It will be noted that, in the first modification, when the control unit 26 is switched to the "continuous operation mode" or the "intermittent operation mode", the control unit 26 actuates the adjusting damper 36 such that the ratio of the blowing amounts blown to the pair of heat exchange elements 28A and 28B becomes 1:1. This makes it possible to perform continuous operation (see FIG. 4) and intermittent operation (see FIG. 5) in the same manner as the configuration of the preceding embodiment.

(Second Modification)

In a second modification shown in FIG. 8, a pair of Peltier elements 32A and 32B are disposed instead of the heater 30 and the Peltier element 32 shown in FIG. 1. The pair of Peltier elements 32A and 32B are respectively attached to the heat exchange elements 28A and 28B so as to cover their entire back surfaces and are configured such that they can respectively independently heat and cool the pair of heat exchange elements 28A and 28B in response to an actuation signal (polarity of an applied voltage) from the control unit 26.

Additionally, when the control unit 26 is switched to the "continuous operation mode" or the "high-humidity operation mode", the pair of heat exchange elements 28A and 28B are switched between a state where one of the pair of heat exchange elements 28A and 28B is heated and the other is cooled by the pair of Peltier elements 32A and 32B and a state where one of the heat exchange elements 28A and 28B is cooled and the other is heated by the pair of Peltier elements 32A and 32B, whereby it becomes possible to perform continuous operation (FIG. 4) and high-humidity operation (see FIG. 6) in the same manner as the configuration of the preceding embodiment.

Further, when the control unit 26 is switched to the "intermittent operation mode", the pair of heat exchange elements 28A and 28B are heated simultaneously and intermittently by the pair of Peltier elements 32A and 32B, whereby it becomes possible to perform intermittent operation (see FIG. 5) in the same manner as the configuration of the preceding embodiment.

Further, according to the second modification, the heat exchange elements 28A and 28B can be respectively cooled by the Peltier elements 32A and 32B, so the adsorption efficiency (dehumidification efficiency) of airborne moisture resulting from the adsorbent can be raised.

(Third Modification)

In a third modification shown in FIG. 9, a Peltier element 38 (heating component) is disposed instead of the heater 30 shown in FIG. 1. The Peltier element 38 is attached to the pair of heat exchange elements 28A and 28B so as to cover their entire back surfaces and is configured such that it can simultaneously heat and cool the pair of heat exchange elements 28A and 28B in response to an actuation signal (polarity of an applied voltage) from the control unit 26.

Additionally, when the control unit 26 is switched to the "intermittent operation mode", the pair of heat exchange elements 28A and 28B are heated simultaneously and intermittently by the Peltier element 38, whereby it becomes possible to perform intermittent operation (see FIG. 5) in the same manner as the configuration of the preceding embodiment.

Further, according to the third modification, the heat exchange elements 28A and 28B can be cooled simultaneously by the Peltier element 38, so the adsorption efficiency (dehumidification efficiency) of airborne moisture resulting from the adsorbent can be raised.

(Other Modifications)

In the preceding embodiment, at the time of the intermittent operation mode, the control unit 26 may adjust the blowing amounts of the pair of blowers 12A and 12B such that the blowing amount that the pair of blowers 12A and 12B blow to the pair of heat exchange elements 28A and 28B when they are unheated becomes larger than the blowing amount that the pair of blowers 12A and 12B blow to the pair of heat exchange elements 28A and 28B when they are being heated by the heater 30. This makes it possible to increase, in the same manner as at the time of the high-humidity operation mode, the humidifying amount per unit quantity of the humidified air (absolute humidity of humidified air) when the humidified air is generated by the humidifying/dehumidifying unit 16.

Further, the preceding embodiment was configured such that the flow paths were arranged in the vehicle vertical direction, but the embodiment may also be configured such that the flow paths are arranged in the vehicle width direction.

Further, the preceding embodiment was configured such that the dehumidified air was blown out from the dehumidifying flow path 24 toward the surface of the front window on the vehicle cabin side, but the embodiment may also be configured such that the dehumidified air is blown out from the dehumidifying flow path 24 toward surfaces of rear and front windows on the vehicle cabin side or such that the dehumidified air is blown out from the dehumidifying flow path 24 toward surfaces of side windows in the front or side windows in the rear on the vehicle cabin side.

[Second Embodiment]

Next, the configuration of a vehicle humidifying/dehumidifying device 50 pertaining to a second embodiment of the present invention will be described.

In FIG. 10, there is shown the overall configuration of the vehicle humidifying/dehumidifying device 50 pertaining to the second embodiment of the present invention. It will be noted that, in FIG. 10A, there is shown a side view of the vehicle humidifying/dehumidifying device 50, and in FIG. 10B, there is shown an enlarged plan view of relevant portions of the vehicle humidifying/dehumidifying device 50. Further, arrow FR, arrow OUT and arrow UP shown in the drawings respectively represent a vehicle longitudinal direction front side, a vehicle width direction outer side and a vehicle vertical direction upper side when the vehicle humidifying/dehumidifying device 50 is installed in a vehicle.

As shown in these drawings, the vehicle humidifying/dehumidifying device 50 pertaining to the second embodiment of the present invention has, as its main configuration, blowers 12A and 12B (blowing components), connecting flow paths 52A and 52B, switching dampers 54A and 54B (part of a switching component), a pair of connecting flow paths 56A and 56B, a humidifying/dehumidifying unit 16 (humidifying/dehumidifying unit), a pair of connecting flow paths 58A and 58B, blowout flow paths 60A and 60B, and a control unit 62 (humidifying amount increasing component, air introduction amount adjusting component, blowing amount adjusting component, blowing ratio control component, heating control component).

For the blowers 12A and 12B and the humidifying/dehumidifying unit 16, there are used components that are the same as those of the vehicle humidifying/dehumidifying device 10 pertaining to the preceding first embodiment (only their inside arrangement is slightly different).

The pair of connecting flow paths 52A and 52B are respectively configured by hollow bodies. The one connecting flow path 52A is given a configuration where it communicates the blower 12A and the switching damper 54A, and the other connecting flow path 52B is given a configuration where it communicates the blower 12B and the switching damper 54B.

The switching damper 54A includes a drive component and is given a configuration which, by the driving of this drive component, can switch the communicated flow paths between the connecting flow path 52A and the blowout flow path 60B and the pair of connecting flow paths 56A and 56B. In other words, the switching damper 54A is configured to be capable of switching between a state where it communicates the connecting flow path 52A and the connecting flow path 56A and communicates the blowout flow path 60B and the connecting flow path 56B and a state where it communicates the connecting flow path 52A and the connecting flow path 56B and communicates the blowout flow path 60B and the connecting flow path 56A.

Similarly, the switching damper 54B includes a drive component and is given a configuration which, by the driving of this drive component, can switch the communicated flow paths between the connecting flow path 52B and the blowout flow path 60A and the pair of connecting flow paths 58A and 58B. In other words, the switching damper 54B is configured to be capable of switching between a state where it communicates the connecting flow path 52B and the connecting flow path 58B and communicates the blowout flow path 60A and the connecting flow path 58A and a state where it communicates the connecting flow path 52B and the connecting flow path 58A and communicates the blowout flow path 60A and the connecting flow path 58B.

Further, the switching dampers 54A and 54B are configured to actuate and switch between the communicated states in response to actuation signals from the later-described control unit 62.

The pairs of connecting flow paths 56A and 56B and 58A and 58B are respectively configured by hollow bodies. The pair of connecting flow paths 56A and 56B are given a configuration where they respectively communicate the switching damper 54A and the heat exchange elements 28A and 28B of the humidifying/dehumidifying unit 16, and the pair of connecting flow paths 58A and 58B are given a configuration where they respectively communicate the heat exchange elements 28A and 28B of the humidifying/dehumidifying unit 16 and the switching damper 54B.

The blowout flow paths 60A and 60B are configured by ventilation ducts or the like, for example. The one blowout flow path 60A is configured to be provided with: a humidifying flow path 64A for blowing out, toward a passenger in a driver seat in a vehicle cabin (first region), for example, air that has been blown from the switching damper 54B; a dehumidifying flow path 66A for blowing out, toward a surface of a front window on a vehicle cabin side (second region), for example, air that has been blown from the switching damper 54B; and switching dampers 68A and 70A (part of a switching component) that are capable of directing air blown from the switching damper 54B to the humidifying flow path 64A and the dehumidifying flow path 66A by the driving of a drive component.

Further, the other blowout flow path 60B is configured to be provided with: a humidifying flow path 64B for blowing out, toward a passenger in a front passenger seat in a vehicle cabin (first region), for example, air that has been blown from the switching damper 54A; a dehumidifying flow path 66B for blowing out, toward a surface of a front window on a vehicle cabin side (second region), for example, air that has been blown from the switching damper 54A; and switching dampers 68B and 70B (part of a switching component) that are capable of directing air blown from the switching damper 54A to the humidifying flow path 64B and the dehumidifying flow path 66B by the driving of a drive component.

The control unit 62 is configured by an electrical circuit disposed with a CPU, a ROM and a RAM, for example, and is configured such that it can control operation of the blowers 12A and 12B, the heater 30 and the Peltier element 32 of the humidifying/dehumidifying unit 16, the switching dampers 54A and 54B and the switching dampers 68A, 68B, 70A and 70B in response to, for example, a control signal from an external control device (e.g., a main control unit or an operation panel) or a detection signal from a sensor that detects the situation in the vehicle cabin. It will be noted that specific operation of the control unit 62 will be described in conjunction with operation of the device overall below.

Next, operation and the action and effects of the vehicle humidifying/dehumidifying device 50 pertaining to the second embodiment of the present invention will be described.

The control unit 62 switches to a "continuous operation mode", an "intermittent operation mode" or a "high-humidity operation mode" in response to, for example, a control signal from an external control device (e.g., a main control unit or an operation panel) or a detection signal from a sensor that detects the situation in the vehicle cabin, and when the control unit 62 is switched to the modes, the control unit 62 controls operation of the blowers 12A and 12B, the heater 30 and the Peltier element 32 of the humidifying/dehumidifying unit 16, the switching dampers 54A and 54B and the switching dampers 68A, 68B, 70A and 70B as described below.

Figure 12A:
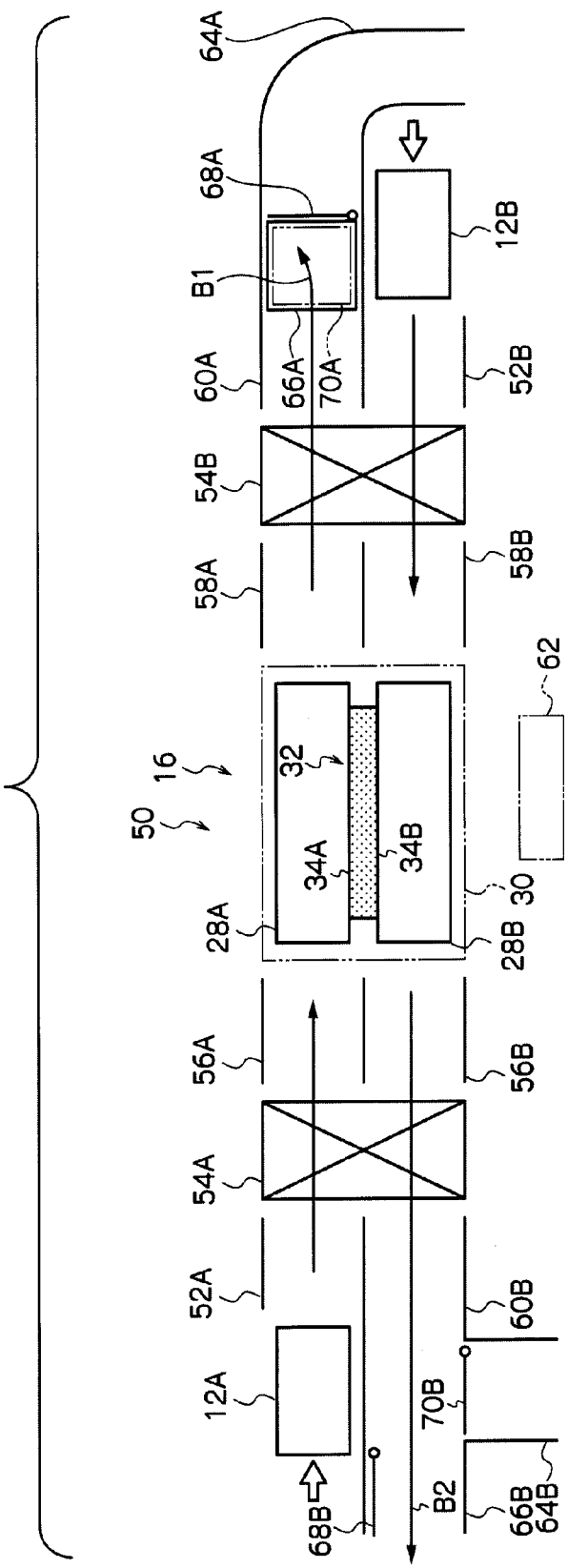
[FIG. 12A] An explanatory view showing an operating state during an intermittent operation mode of the vehicle humidifying/dehumidifying device pertaining to the second embodiment of the present invention.
Figure 12B:
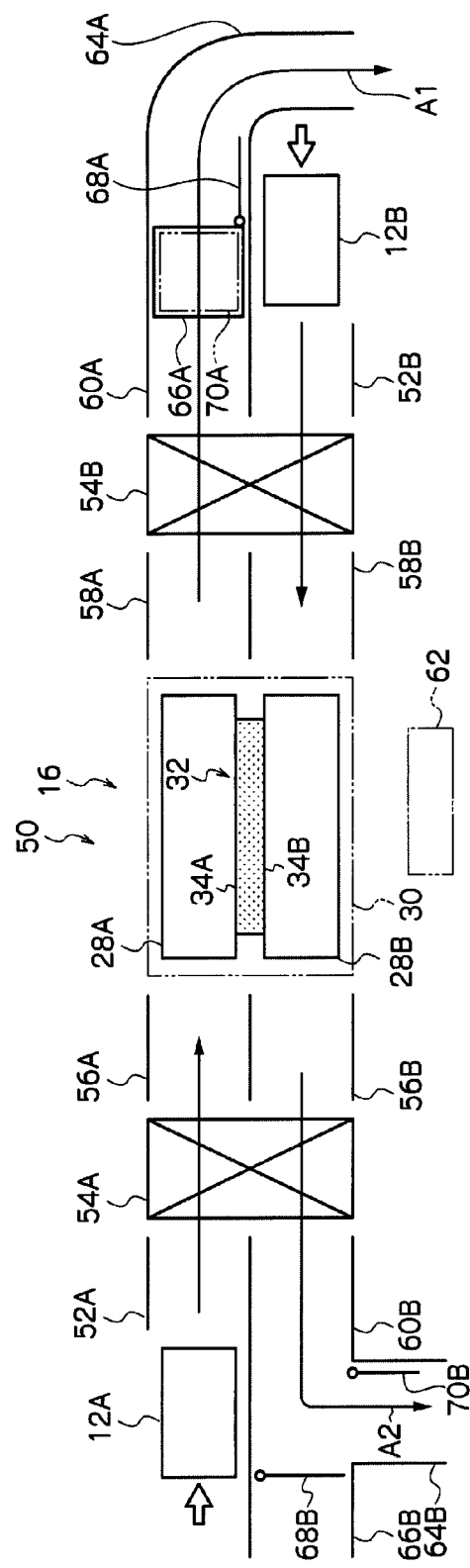
[FIG. 12B] An explanatory view showing an operating state during the intermittent operation mode of the vehicle humidifying/dehumidifying device pertaining to the second embodiment of the present invention.
Figure 13B:
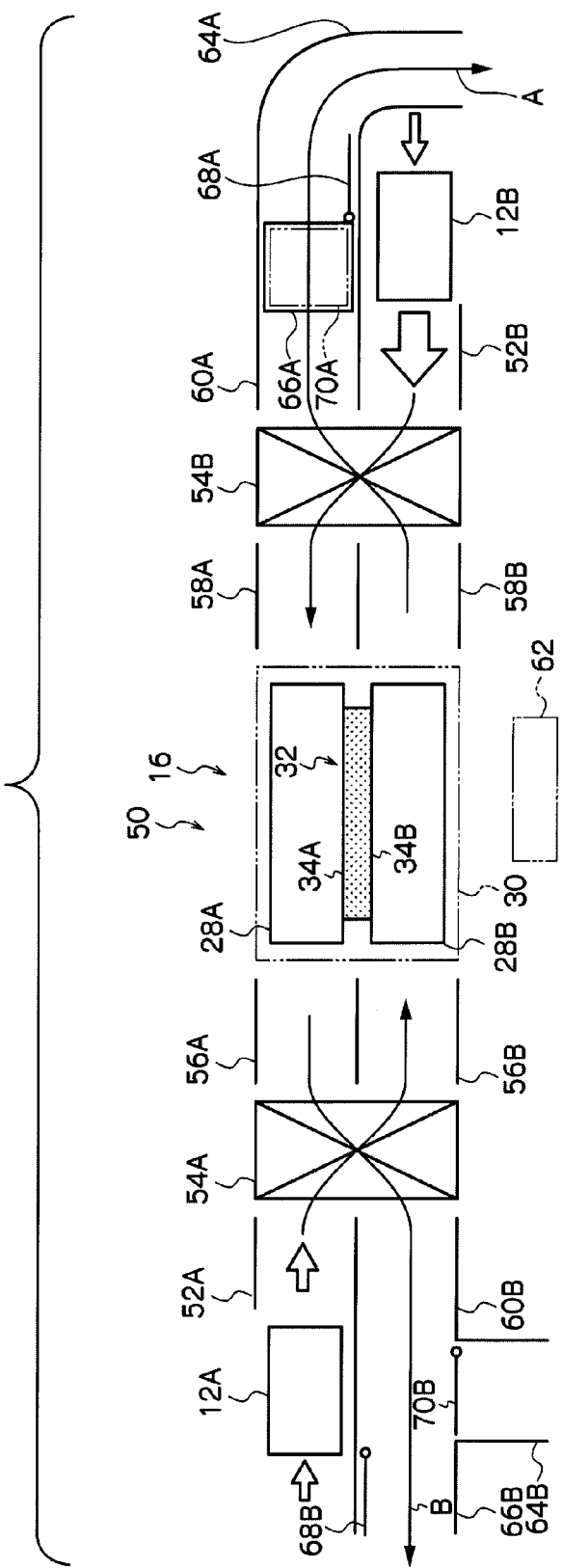
[FIG. 13B] An explanatory view showing an operating state during the high-humidity operation mode of the vehicle humidifying/dehumidifying device pertaining to the second embodiment of the present invention.

In FIG. 11 to FIG. 13, there are respectively shown operating states of the vehicle humidifying/dehumidifying device 50 overall when the control unit 62 is switched to the "continuous operation mode", the "intermittent operation mode" and the "high-humidity operation mode". It will be noted that, in the present embodiment, the "continuous operation mode" is configured to be a normal mode pertaining to the present invention and that the "intermittent operation mode" and the "high-humidity operation mode" are configured to be a humidifying amount increasing mode pertaining to the present invention.

(Continuous Operation Mode)

First, the operating state of the vehicle humidifying/dehumidifying device 50 overall when the control unit 62 is switched to the "continuous operation mode" will be described on the basis of FIG. 11.

When the control unit 62 is switched to the "continuous operation mode", the control unit 62 outputs an actuation signal to the Peltier element 32 to actuate the Peltier element 32 such that the one planar portion 34A of the Peltier element 32 emits heats and the other planar portion 34B of the Peltier element absorbs heat.

Further, the control unit 62 outputs an actuation signal to the switching damper 54A to switch the switching damper 54A to the communicated state where the connecting flow path 52A and the connecting flow path 56A are communicated and where the blowout flow path 60B and the connecting flow path 56B are communicated. Further, the control unit 62 outputs an actuation signal to the switching damper 54B to switch the switching damper 54B to the communicated state where the connecting flow path 58B and the connecting flow path 52B are communicated and where the blowout flow path 60A and the connecting flow path 58A are communicated.

Moreover, the control unit 62 outputs actuation signals to the switching dampers 68A and 70A to switch the switching dampers 68A and 70A such that the air that has been blown from the switching damper 54B is guided to the humidifying flow path 64A. Further, the control unit 62 outputs actuation signals to the switching dampers 68B and 70B such that the air that has been blown from the switching damper 54A is guided to the dehumidifying flow path 66B.

Then, the control unit 64 actuates the pair of blowers 12A and 12B. At this time, the control unit 62 ensures that the blowing amounts of the pair of blowers 12A and 12B become the same (blowing amounts 1:1).

Thus, as shown in FIG. 11A, the air that has been blown from the one blower 12A is introduced to the heat exchange element 28A of the humidifying/dehumidifying unit 16 via the connecting flow paths 52A and 56A. The air that has been introduced to the heat exchange element 28A obtains water released from the adsorbent of the heat exchange element 28A and becomes humidified air when the air passes through the inside of the heat exchange element 28A because the heat exchange element 28A is being heated by the Peltier element 32. The air that has been blown from the other blower 12B is introduced to the heat exchange element 28B of the humidifying/dehumidifying unit 16 via the connecting flow paths 52B and 58B. The air that has been introduced to the heat exchange element 28B has its water adsorbed by the adsorbent of the heat exchange element 28B and becomes dehumidified air when the air passes through the inside of the heat exchange element 28B because the heat exchange element 28B is being cooled by the Peltier element 32.

Further, the humidified air that has been generated by the humidifying/dehumidifying unit 16 in this manner is blown to the switching damper 54B via the connecting flow path 58A, is guided to the blowout flow path 60A by the switching damper 54B, and is further guided to the humidifying flow path 64A by the switching dampers 68A and 70A inside the blowout flow path 60A. Then, the humidified air (arrow A) is blown out toward the passenger in the driver seat in the vehicle cabin (first region), for example, from the humidifying flow path 64A.

Further, the dehumidified air that has been generated by the humidifying/dehumidifying unit 16 in this manner is blown to the switching damper 54A via the connecting flow path 56B, is guided to the blowout flow path 60B by the switching damper 54A, and is further guided to the dehumidifying flow path 66B by the switching dampers 68B and 70B inside the blowout flow path 60B. Then, the dehumidified air (arrow B) is blown out toward the surface of the front window on the vehicle cabin side (second region), for example, from the dehumidifying flow path 66B.

Further, the control unit 62 switches as described next when a certain amount of time (e.g., an amount of time when it is predicted that the adsorbent of the heat exchange element 28A will reach a state where it has released all of its water or that the adsorbent of the heat exchange element 28B will reach a water-saturated state; for example, several minutes) has elapsed after the start of operation of the continuous operation mode.

In other words, the control unit 62 outputs an actuation signal to the Peltier element 32 to actuate the Peltier element 32 such that the one planar portion 34A of the Peltier element 32 absorbs heat and the other planar portion 34B of the Peltier element 32 emits heat.

Further, the control unit 62 outputs an actuation signal to the switching damper 54A to switch the switching damper 54A to the communicated state where the connecting flow path 52A and the connecting flow path 56B are communicated and where the blowout flow path 60B and the connecting flow path 56A are communicated. Further, the control unit 62 outputs an actuation signal to the switching damper 54B to switch the switching damper 54B to the communicated state where the connecting flow path 52B and the connecting flow path 58A are communicated and where the blowout flow path 60A and the connecting flow path 58B are communicated.

Thus, as shown in FIG. 11B, the air that has been blown from the one blower 12A is introduced to the heat exchange element 28B of the humidifying/dehumidifying unit 16 via the connecting flow paths 52A and 56B. The air that has been introduced to the heat exchange element 28B obtains water released from the adsorbent of the heat exchange element 28B and becomes humidified air when the air passes through the inside of the heat exchange element 28B because the heat exchange element 28B is being heated by the Peltier element 32. The air that has been blown out from the other blower 12B is introduced to the heat exchange element 28A of the humidifying/dehumidifying unit 16 via the connecting flow paths 52B and 58A. The air that has been introduced to the heat exchange element 28A has its water adsorbed by the adsorbent of the heat exchange element 28A and becomes dehumidified air when the air passes through the inside of the heat exchange element 28A because the heat exchange element 28A is being cooled by the Peltier element 32.

Further, the humidified air that has been generated by the humidifying/dehumidifying unit 16 in this manner is blown to the switching damper 54B via the connecting flow path 58B, is guided to the blowout flow path 60A by the switching damper 54B, and is further guided to the humidifying flow path 64A by the switching dampers 68A and 70A inside the blowout flow path 60A. Then, the humidified air (arrow A) is blown out toward the passenger in the driver seat in the vehicle cabin (first region), for example, from the humidifying flow path 64A.

Further, the dehumidified air that has been generated by the humidifying/dehumidifying unit 16 in this manner is blown to the switching damper 54A via the connecting flow path 56A, is guided to the blowout flow path 60B by the switching damper 54A, and is further guided to the dehumidifying flow path 66B by the switching dampers 68B and 70B inside the blowout flow path 60B. Then, the dehumidified air (arrow B) is blown out toward the surface of the front window on the vehicle cabin side (second region), for example, from the dehumidifying flow path 66B.

Further, the control unit 62 again switches the Peltier element 32 and the switching dampers 54A and 54B (see FIG. 11A) when a certain amount of time (e.g., an amount of time when it is predicted that the adsorbent of the heat exchange element 28A will reach a water-saturated state or that the adsorbent of the heat exchange element 28B will reach a state where it has released all of its water; for example, several minutes) has elapsed after the start of operation of the continuous operation mode.

Then, the control unit 62 repeats the above-described operations (the operation of FIG. 11A and the operation of FIG. 11B) until the control unit 62 ends the "continuous operation mode" in response to, for example, a control signal from an external control device (e.g., a main control unit or an operation panel) or a detection signal from a sensor that detects the situation in the vehicle cabin. Thus, the humidified air (arrow A) and the dehumidified air (arrow B) are continuously blown out from the vehicle humidifying/dehumidifying device 50. It will be noted that, at this time, a water amount of 2 to 3 $g/m^3$ can be supplied to the passenger.

In this manner, in the vehicle humidifying/dehumidifying device 50 pertaining to the second embodiment of the present invention, when the control unit 62 is switched to the "continuous operation mode", humidified air and dehumidified air are simultaneously continuously blown out. Thus, moisture is supplied to the passenger so that a comfortable vehicle cabin space can be provided, and fogging of the front window can be reliably prevented.

(Intermittent Operation Mode)

Next, the operating state of the vehicle humidifying/dehumidifying device 50 overall when the control unit 62 is switched to the "intermittent operation mode" will be described on the basis of FIG. 12.

When the control unit 62 is switched to the "intermittent operation mode", the control unit 62 outputs an actuation signal to the switching damper 54A to switch the switching damper 54A to the communicated state where the connecting flow path 52A and the connecting flow path 56A are communicated and where the blowout flow path 60B and the connecting flow path 56B are communicated. Further, the control unit 62 outputs an actuation signal to the switching damper 54B to switch the switching damper 54B to the communicated state where the connecting flow path 52B and the connecting flow path 58B are communicated and where the blowout flow path 60A and the connecting flow path 58A are communicated.

Moreover, the control unit 62 outputs actuation signals to the switching dampers 68A and 70A to switch the switching dampers 68A and 70A such that the air that has been blown from the switching damper 54B is guided to the dehumidifying flow path 66A. Further, the control unit 62 outputs actuation signals to the switching dampers 68B and 70B to switch the switching dampers 68B and 70B such that the air that has been blown from the switching damper 54A is guided to the dehumidifying flow path 66B.

Then, the control unit 62 actuates the pair of blowers 12A and 12B. At this time, the control unit 62 ensures that the blowing amounts of the pair of blowers 12A and 12B become the same (blowing amounts 1:1).

Thus, as shown in FIG. 12A, the air that has been blown from the blowers 12A and 12B is introduced to the heat exchange elements 28A and 28B of the humidifying/dehumidifying unit 16. The air that has been introduced to the heat exchange elements 28A and 28B has its water adsorbed by the adsorbents of the heat exchange elements 28A and 28B and becomes dehumidified air when the air passes through the insides of the heat exchange elements 28A and 28B because the heat exchange elements 28A and 28B are not being heated by the heater 30 and the Peltier element 32.

Further, the dehumidified air that has been generated by the humidifying/dehumidifying unit 16 in this manner is respectively blown to the switching dampers 54A and 54B and is guided to the dehumidifying flow paths 66A and 66B by the switching dampers 54A and 54B. Then, the dehumidified air (arrow B1) that has been guided to the dehumidifying flow path 66A of the blowout flow path 60A is blown out toward the surface of the front window on the vehicle cabin side (second region), for example, from the dehumidifying flow path 66A, and the dehumidified air (arrow B2) that has been guided to the dehumidifying flow path 66B of the blowout flow path 60B is blown out toward the surface of the front window on the vehicle cabin side (second region), for example, from the dehumidifying flow path 66B.

Further, the control unit 62 switches as described next when a certain amount of time (e.g., an amount of time when it is predicted that the adsorbents of the heat exchange elements 28A and 28B will reach a water-saturated state; for example, several minutes) has elapsed after the start of operation of the intermittent operation mode.

In other words, the control unit 62 outputs an actuation signal to the heater 30 to actuate the heater 30. Further, the control unit 62 outputs actuation signals to the switching dampers 68A and 70A to switch the switching dampers 68A and 70A such that the air that has been blown from the switching damper 54B is guided to the humidifying flow path 64A. Further, the control unit 62 outputs actuation signals to the switching dampers 68B and 70B to actuate the switching dampers 68B and 70B such that the air that has been blown out from the switching damper 54A is guided to the humidifying flow path 64B.

Thus, as shown in FIG. 12B, the air that has been blown from the blowers 12A and 12B is introduced to the heat exchange elements 28A and 28B of the humidifying/dehumidifying unit 16. The air that has been introduced to the heat exchange elements 28A and 28B obtains water released from the adsorbents of the heat exchange elements 28A and 28B and becomes humidified air when the air passes through the insides of the heat exchange elements 28A and 28B because the heat exchange elements 28A and 28B are being heated by the heater 30.

Further, the humidified air that has been generated by the humidifying/dehumidifying unit 16 in this manner is respectively blown to the switching dampers 54A and 54B and is guided to the humidifying flow paths 64A and 64B of the blowout flow paths 60A and 60B by the switching dampers 54A and 54B. Then, the humidified air (arrow A1) that has been guided to the humidifying flow path 64A of the blowout flow path 60A is blown out toward the passenger in the driver seat in the vehicle cabin (first region), for example, from the humidifying flow path 64A, and the humidified air (arrow A2) that has been guided to the humidifying flow path 64B of the blowout flow path 60B is blown out toward the passenger in the front passenger seat in the vehicle cabin (first region), for example, from the humidifying flow path 64B.

Further, the control unit 62 again switches the heater 30 and the switching dampers 68A, 68B, 70A and 70B (see FIG. 12A) when a certain amount of time (e.g., an amount of time when it is predicted that the adsorbents of the heat exchange elements 28A and 28B will reach a state where they have released all of their water; for example, several minutes) has elapsed after the aforementioned switching operation.

Then, the control unit 62 repeats the above-described operations (the operation of FIG. 12A and the operation of FIG. 12B) until the control unit 62 ends the "intermittent operation mode" in response to, for example, a control signal from an external control device (e.g., a main control unit or an operation panel) or a detection signal from a sensor that detects the situation in the vehicle cabin. Thus, the humidified air (arrows A1 and A2) and the dehumidified air (arrows B1 and B2) are alternately continuously blown out from the vehicle humidifying/dehumidifying device 50.

In this manner, in the vehicle humidifying/dehumidifying device 50 pertaining to the second embodiment of the present invention, when the control unit 62 is switched to the "intermittent operation mode", the pair of heat exchange elements 28A and 28B are heated simultaneously and intermittently. Additionally, this allows humidified air to be generated by both of the pair of heat exchange elements 28A and 28B when the pair of heat exchange elements 28A and 28B are being heated simultaneously by the heater 30. Consequently, in comparison to the case of the continuous operation mode (see FIG. 11), the humidifying amount imparted to the humidified air when the humidified air is generated by the humidifying/dehumidifying unit 16 can be increased.

Thus, it becomes possible to perform humidifying amount control corresponding to various situations in the vehicle cabin, and it becomes possible to provide a more comfortable vehicle cabin space for the passengers.

Further, according to the vehicle humidifying/dehumidifying device 50 pertaining to the second embodiment of the present invention, more water can be supplied to the passengers as a result of the vehicle humidifying/dehumidifying device 50 performing intermittent operation as described above in the vehicle cabin whose water amount is limited.

(High-Humidity Operation Mode)

Next, the operating state of the vehicle humidifying/dehumidifying device 50 overall when the control unit 62 is switched to the "high-humidity operation mode" will be described on the basis of FIG. 13.

When the control unit 62 is switched to the "high-humidity operation mode", the control unit 62 outputs an actuation signal to the Peltier element 32 to actuate the Peltier element 32 such that the one planar portion 34A of the Peltier element 32 emits heat and the other planar portion 34B of the Peltier element 32 absorbs heat.

Further, the control unit 62 outputs an actuation signal to the switching damper 54A to switch the switching damper 54A to the communicated state where the connecting flow path 52A and the connecting flow path 56A are communicated and where the blowout flow path 60B and the connecting flow path 56B are communicated. Further, the control unit 62 outputs an actuation signal to the switching damper 54B to switch the switching damper 54B to the communicated state where the connecting flow path 52B and the connecting flow path 58B are communicated and where the blowout flow path 60A and the connecting flow path 58A are communicated.

Moreover, the control unit 62 outputs actuation signals to the switching dampers 68A and 70A to switch the switching dampers 68A and 70A such that the air that has been blown from the switching damper 54B is guided to the humidifying flow path 64A. Further, the control unit 62 outputs actuation signals to the switching dampers 68B and 70B to switch the switching dampers 68B and 70B such that the air that has been blown from the switching damper 54A is guided to the dehumidifying flow path 66B.

Then, the control unit 62 actuates the pair of blowers 12A and 12B. At this time, the control unit 62 ensures that the blowing amount of the one blower 12A becomes half the blowing amount of the other blower 12B (blowing amounts 1:2).

Thus, as shown in FIG. 13(a), the air that has been blown from the one blower 12A is introduced to the heat exchange element 28A of the humidifying/dehumidifying unit 16 via the connecting flow paths 52A and 56A. The air that has been introduced to the heat exchange element 28A obtains water released from the adsorbent of the heat exchange element 28A and becomes humidified air when the air passes through the inside of the heat exchange element 28A because the heat exchange element 28A is being heated by the Peltier element 32. The air that has been blown from the other blower 12B is introduced to the heat exchange element 28B of the humidifying/dehumidifying unit 16 via the connecting flow paths 52B and 58B. The air that has been introduced to the heat exchange element 28B has its water adsorbed by the adsorbent of the heat exchange element 28B and becomes dehumidified air when the air passes through the inside of the heat exchange element 28B because the heat exchange element 28B is being cooled by the Peltier element 32.

Further, the humidified air that has been generated by the humidifying/dehumidifying unit 16 in this manner is blown to the switching damper 54B via the connecting flow path 58A, is guided to the blowout path 60A by the switching damper 54B, and is further guided to the humidifying flow path 64A by the switching dampers 68A and 70A inside the blowout flow path 60A. Then, the humidified air (arrow A) is blown out toward the passenger in the driver seat in the vehicle cabin (first region), for example, from the humidifying flow path 64A.

Further, the dehumidified air that has been generated by the humidifying/dehumidifying unit 16 is blown to the switching damper 54A via the connecting flow path 56B, is guided to the blowout flow path 60B by the switching damper 54A, and is further guided to the dehumidifying flow path 66B by the switching dampers 68B and 70B inside the blowout flow path 60B. Then, the dehumidified air (arrow B) is blown out toward the surface of the front window on the vehicle cabin side (second region), for example, from the dehumidifying flow path 24.

Further, the control unit 62 switches as described next when a certain amount of time (e.g., an amount of time when it is predicted that the adsorbent of the heat exchange element 28A will reach a state where it has released all of its water or that the adsorbent of the heat exchange element 28B will reach a water-saturated state; for example, several minutes) has elapsed after the start of operation of the high-humidity operation mode.

In other words, the control unit 62 outputs an actuation signal to the Peltier element 32 to actuate the Peltier element 32 such that the one planar portion 34A of the Peltier element 32 absorbs heat and the other planar portion 34B of the Peltier element 32 emits heat.

Further, the control unit 62 outputs an actuation signal to the switching damper 54A to switch the switching damper 54A to the communicated state where the connecting flow path 52A and the connecting flow path 56B are communicated and where the blowout flow path 60B and the connecting flow path 56A are communicated. Further, the control unit 62 outputs an actuation signal to the switching damper 54B to switch the switching damper 54B to the communicated state where the connecting flow path 52B and the connecting flow path 58A are communicated and where the blowout flow path 60A and the connecting flow path 58B are communicated.

Further, the control unit 62 actuates the pair of blowers 12A and 12B. At this time, the control unit 62 ensures that the blowing amount of the one blower 12A becomes half the blowing amount of the other blower 12B (blowing amounts 1:2).

Thus, as shown in FIG. 13(*b*), the air that has been blown from the one blower 12A is introduced to the heat exchange element 28B of the humidifying/dehumidifying unit 16 via the connecting flow paths 52A and 56B. The air that has been introduced to the heat exchange element 28B obtains water released from the adsorbent of the heat exchange element 28B and becomes humidified air when the air passes through the inside of the heat exchange element 28B because the heat exchange element 28B is being heated by the Peltier element 32. The air that has been blown from the other blower 12B is introduced to the heat exchange element 28A of the humidifying/dehumidifying unit 16 via the connecting flow paths 52B and 58A. The air that has been introduced to the heat exchange element 28A has its water adsorbed by the adsorbent of the heat exchange element 28A and becomes dehumidified air when the air passes through the inside of the heat exchange element 28A because the heat exchange element 28A is being cooled by the Peltier element 32.

Further, the humidified air that has been generated by the humidifying/dehumidifying unit 16 in this manner is blown to the switching damper 54B via the connecting flow path 58B, is guided to the blowout flow path 60A by the switching damper 54B, and is further guided to the humidifying flow path 64A by the switching dampers 68A and 70A inside the blowout flow path 60A. Then, the humidified air (arrow A) is blown out toward the passenger in the driver seat in the vehicle cabin (first region), for example, from the humidifying flow path 64A.

Further, the dehumidified air that has been generated by the humidifying/dehumidifying unit 16 is blown to the switching damper 54A via the connecting flow path 56A, is guided to the blowout flow path 60B via the switching damper 54A, and is further guided to the dehumidifying flow path 66B by the switching dampers 68B and 70B inside the blowout flow path 60B. Then, the dehumidified air (arrow B) is blown out toward the surface of the front window on the vehicle cabin side (second region), for example, from the dehumidifying flow path 66B.

Further, the control unit 62 again switches the Peltier element 32 and the switching dampers 54A and 54B (see FIG. 13(*a*)) when a certain amount of time (e.g., an amount of time when it is predicted that the adsorbent of the heat exchange element 28A will reach a water-saturated state or that the adsorbent of the heat exchange element 28B will reach a state where it has released all of its water; for example, several minutes) has elapsed after the start of operation of the high-humidity operation mode.

Further, the control unit 62 actuates the pair of blowers 12A and 12B. At this time, the control unit 62 ensures that the blowing amount of the one blower 12A becomes half the blowing amount of the other blower 12B (blowing amounts 1:2).

Then, the control unit 62 repeats the above-described operations (the operation of FIG. 13(*a*) and the operation of FIG. 13(*b*)) until the control unit 62 ends the "high-humidity operation mode" in response to, for example, a control signal from an external control device (e.g., a main control unit or an operation panel) or a detection signal from a sensor that detects the situation in the vehicle cabin. Thus, the humidified air (arrow A) and the dehumidified air (arrow B) are continuously blown out from the vehicle humidifying/dehumidifying device 50.

In this manner, in the vehicle humidifying/dehumidifying device 50 pertaining to the second embodiment of the present invention, when the control unit 62 is switched to the "high-humidity operation mode", the blowing amounts of the pair of blowers 12A and 12B are adjusted, and operation of the switching dampers 54A and 54B is switched, such that the ratio of the blowing amount that one of the pair of blowers 12A and 12B blows to the heat exchange element of the pair of heat exchange elements 28A and 28B that is unheated to the blowing amount that the other of the pair of blowers 12A and 12B blows to the heat exchange element of the pair of heat exchange elements 28A and 28B that is being heated becomes 2:1. For this reason, the amount of air introduced to the heat exchange element of the pair of heat exchange elements 28A and 28B that is unheated becomes larger than the amount of air introduced to the heat exchange element of the pair of heat exchange elements 28A and 28B that is being heated.

Consequently, when the heat exchange elements 28A and 28B are switched to heat exchange elements that are unheated without being heated by the Peltier element 32, water can be adsorbed from more air by the adsorbent because the amount of air introduced is large. For this reason, when the heat exchange elements 28A and 28B are switched to heat exchange elements that are being heated by the Peltier element 32 thereafter, more water can be released to the introduced air from the adsorbent. Moreover, a smaller amount of air is introduced to the heat exchange element of the pair of heat exchange elements 28A and 28B that is being heated than to the heat exchange element that is unheated. Thus, in comparison to the case of the continuous operation mode (see FIG. 11), the humidifying amount per unit quantity of the humidified air (absolute humidity of humidified air) when the humidified air is generated by the humidifying/dehumidifying unit 16 can be increased. It will be noted that, at this time, a water amount of 4 to 6 g/m$^3$ can be supplied to the passengers.

Thus, it becomes possible to perform humidifying amount control corresponding to various situations in the vehicle cabin, and it becomes possible to provide a more comfortable vehicle cabin space for the passengers.

Further, according to the vehicle humidifying/dehumidifying device 50 pertaining to the second embodiment of the present invention, more water can be supplied to the passengers as a result of the vehicle humidifying/dehumidifying device 50 performing high-humidity operation as described above in the vehicle cabin whose water amount is limited.

Next, modifications of the vehicle humidifying/dehumidifying device 50 pertaining to the second embodiment of the present invention will be described.

In the preceding embodiment, at the time of the intermittent operation mode, the control unit 62 may adjust the blowing amounts of the pair of blowers 12A and 12B such that the blowing amount that the pair of blowers 12A and 12B blow to the pair of heat exchange elements 28A and 28B when they are unheated becomes larger than the blowing amount that the pair of blowers 12A and 12B blow to the pair of heat exchange elements 28A and 28B when they are being heated by the heater 30. This makes it possible to increase, in the same manner as at the time of the high-humidity operation mode, the humidifying amount per unit quantity of the humidified air (absolute humidity of humidified air) when the humidified air is generated by the humidifying/dehumidifying unit 16.

Further, the preceding embodiment was configured such that the flow paths were arranged in the vehicle vertical direction, but the embodiment may also be configured such that the flow paths are arranged in the vehicle width direction.

Further, the preceding embodiment was configured such that the dehumidified air was respectively blown out from the dehumidifying flow paths 66A and 66B toward the surface of the front window on the vehicle cabin side, but the embodiment may also be configured such that the dehumidified air is blown out from the dehumidifying flow paths 66A and 66B toward surfaces of side windows in the front or side windows in the rear on the vehicle cabin side.

[Example of Application to a Vehicle]

Next, an example of application of the vehicle humidifying/dehumidifying device 10 pertaining to the first embodiment of the present invention to a vehicle 80 will be described.

Figure 14:
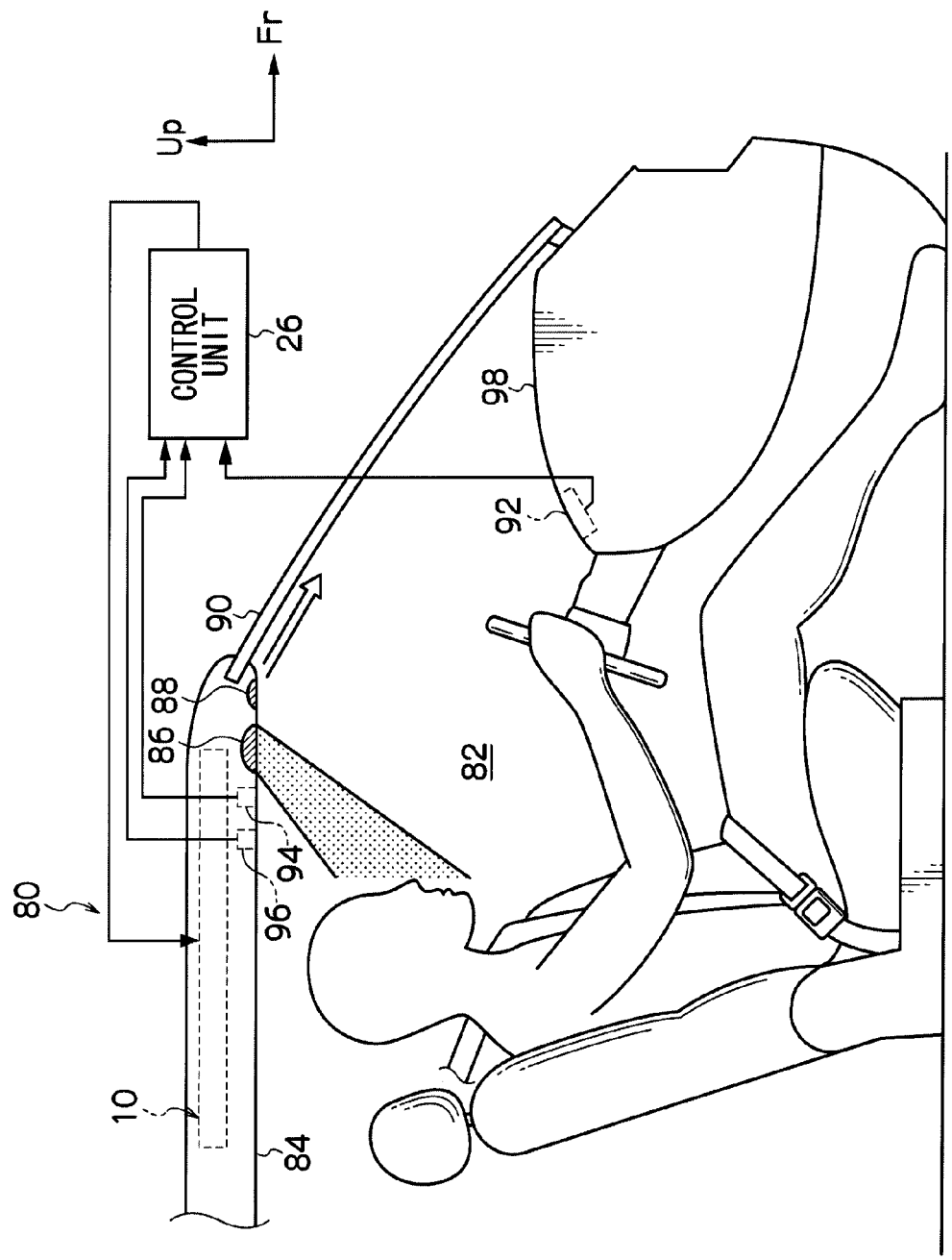
[FIG. 14] A side sectional view of a vehicle to which the vehicle humidifying/dehumidifying device pertaining to the first embodiment of the invention has been applied.
Figure 15:
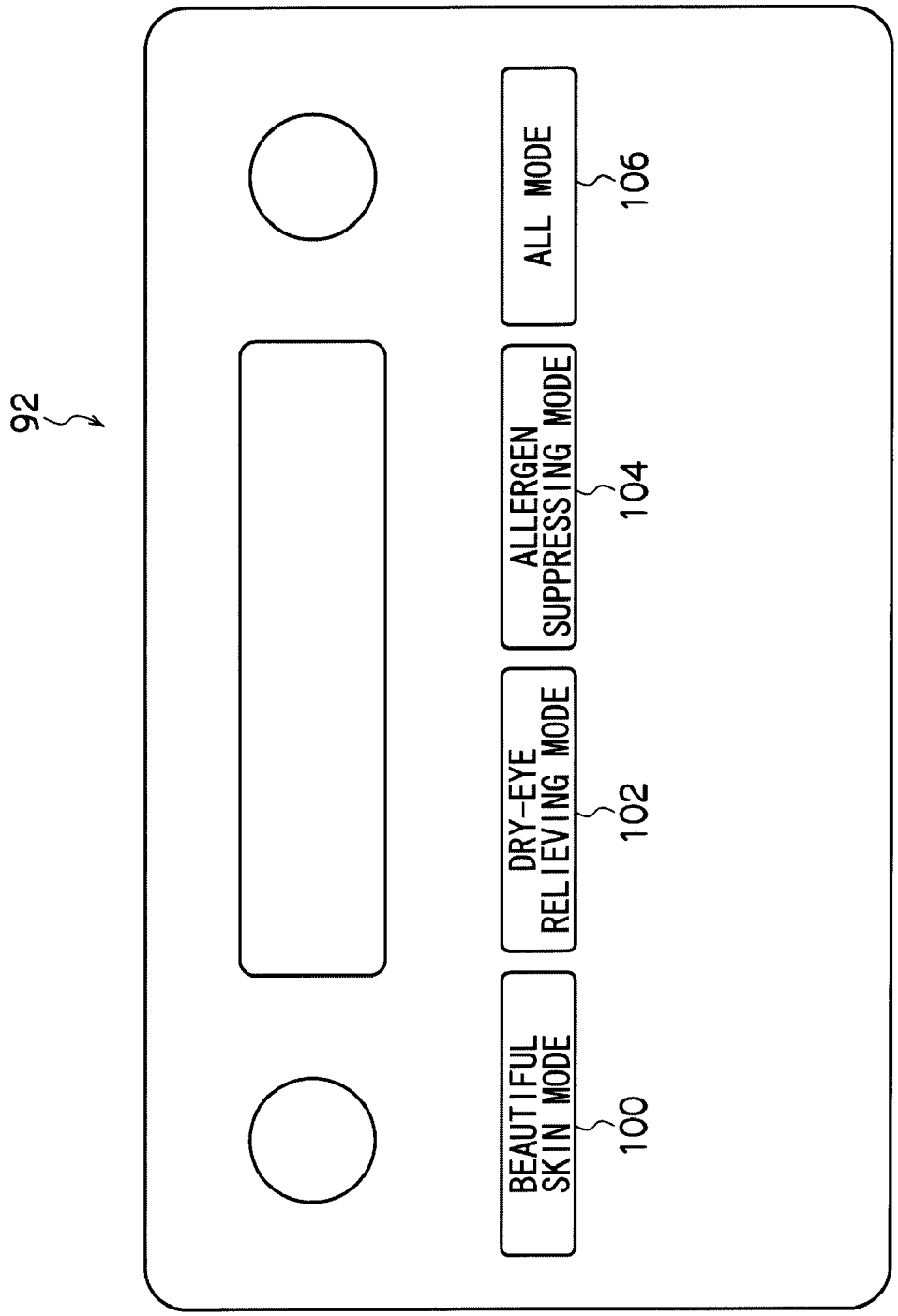
[FIG. 15] A front view of an operation panel that is disposed in the vehicle shown in FIG. 14.

In FIG. 14, there is shown a side sectional view of the vehicle 80 to which the vehicle humidifying/dehumidifying unit 10 pertaining to the first embodiment of the present invention has been applied, and in FIG. 15, there is shown a front view of an operation panel 92 for the vehicle humidifying/dehumidifying unit 10 pertaining to the first embodiment of the present invention. It will be noted that arrow Fr and arrow Up shown in FIG. 14 respectively represent a vehicle longitudinal direction front side and a vehicle vertical direction upper side.

As shown in FIG. 14, in the vehicle 80, the vehicle humidifying/dehumidifying device 10 (the portion thereof excluding the control unit 26) is installed in a ceiling portion 84 in a vehicle cabin 82. A blowout opening (see FIG. 1) of the humidifying flow path 22 disposed in the vehicle humidifying/dehumidifying device 10 is connected to a nozzle 86 that is disposed in the ceiling portion 84 in the vehicle cabin 82, for example. The nozzle 86 is configured such that its blowing direction is capable of being changed by an unillustrated drive component and is configured such that it can locally spray the humidified air sent from the humidifying flow path 22 mainly to the head (more specifically, the entire face, eyes, nose and mouth) of a passenger P.

Further, a blowout opening (see FIG. 1) of the dehumidifying flow path 24 disposed in the vehicle humidifying/dehumidifying device 10 is connected to a blowout opening 88 that is disposed in the ceiling portion 84 in the vehicle cabin 82. The blowout opening 88 is configured with its blowing direction being set such that it can blow out the dehumidified air toward the surface of a front window 90 on the vehicle cabin 82 side.

Further, the vehicle 80 is, in addition to the vehicle humidifying/dehumidifying device 10, disposed with an operation panel 92, a distance sensor 94 and a thermographic device 96.

The operation panel 92 is integrally disposed in, for example, the vehicle width direction center portion of an instrument panel 98 that is installed in the vehicle 80. On the operation panel 92, as shown in FIG. 15, there are disposed a beautiful skin mode switch 100, a dry-eye relieving mode switch 102, an allergen suppressing mode switch 104 and an ALL mode switch 106. Additionally, the operation panel 192 is configured to output an operation signal to the control unit 26 in response to the operation switches being operated by the passenger P.

The distance sensor 94 is disposed adjacent to the nozzle 86 in the ceiling portion 84 of the vehicle cabin 82. The distance sensor 94 is configured by an ultrasonic sensor or a camera, for example. Additionally, the distance sensor 94 is configured to measure the distance to the head of the passenger P in the vehicle cabin 82 and output a measurement signal corresponding to the measurement result to the control unit 26.

The thermographic device 96 is installed next to the distance sensor 94 in the ceiling portion 84 in the vehicle cabin 82. The thermographic device 96 is configured such that it can detect the temperature distribution of the entire face of the passenger P and output the detected data to the control unit 26.

The control unit 26 is disposed in an appropriate position in the vehicle 80, such as inside the instrument panel 98. The control unit 26 controls operation of the vehicle humidifying/dehumidifying device 10 and the spraying direction of the nozzle 86, as described in detail later, on the basis of the operation signal from the operation panel 92, the measurement signal from the distance sensor 94 and the detection data from the thermographic device 96.

Further, in the control unit 26, information is digitized and stored beforehand as described next, for example, in order for the control unit 26 to adjust the humidifying amount per one-time spraying, the interval of intermittent spraying of the humidified air and the spraying velocity of the humidified air on the basis of the operation signal from the operation panel 92. In FIG. 16 and FIG. 17, there are shown explanatory views showing the content of information that has been digitized and stored in the control unit 26, and in FIG. 18, there is shown the relationship between plural object items and targets (target values) of absolute humidity in the vehicle cabin 82.

First, before the specific content of the information that has been digitized and stored in the control unit 26 is described, the relationship between the plural object items and the targets (target values) of absolute humidity in the vehicle cabin shown in the map of FIG. 18 will be described. As shown in this map, in the present embodiment, "prevention of drying of the skin of the passenger in the vehicle cabin", "prevention of drying of the eyes of the passenger in the vehicle cabin", "prevention of dispersion of allergens in the vehicle cabin", "prevention of dispersion of viruses in the vehicle cabin" and "prevention of dispersion of bacteria in the vehicle cabin" are set as the plural object items.

An absolute humidity of 11 g/Kg is set as the target (target value) of absolute humidity in the vehicle cabin for "prevention of drying of the skin of the passenger in the vehicle cabin", an absolute humidity of 7 g/Kg is set as the target (target value) of absolute humidity in the vehicle cabin for "prevention of drying of the eyes of the passenger in the vehicle cabin", and an absolute humidity of 9 g/Kg is set as the target (target value) of absolute humidity in the vehicle cabin for "prevention of dispersion of allergens in the vehicle cabin", "prevention of dispersion of viruses in the vehicle cabin" and "prevention of dispersion of bacteria in the vehicle cabin".

Figure 18:
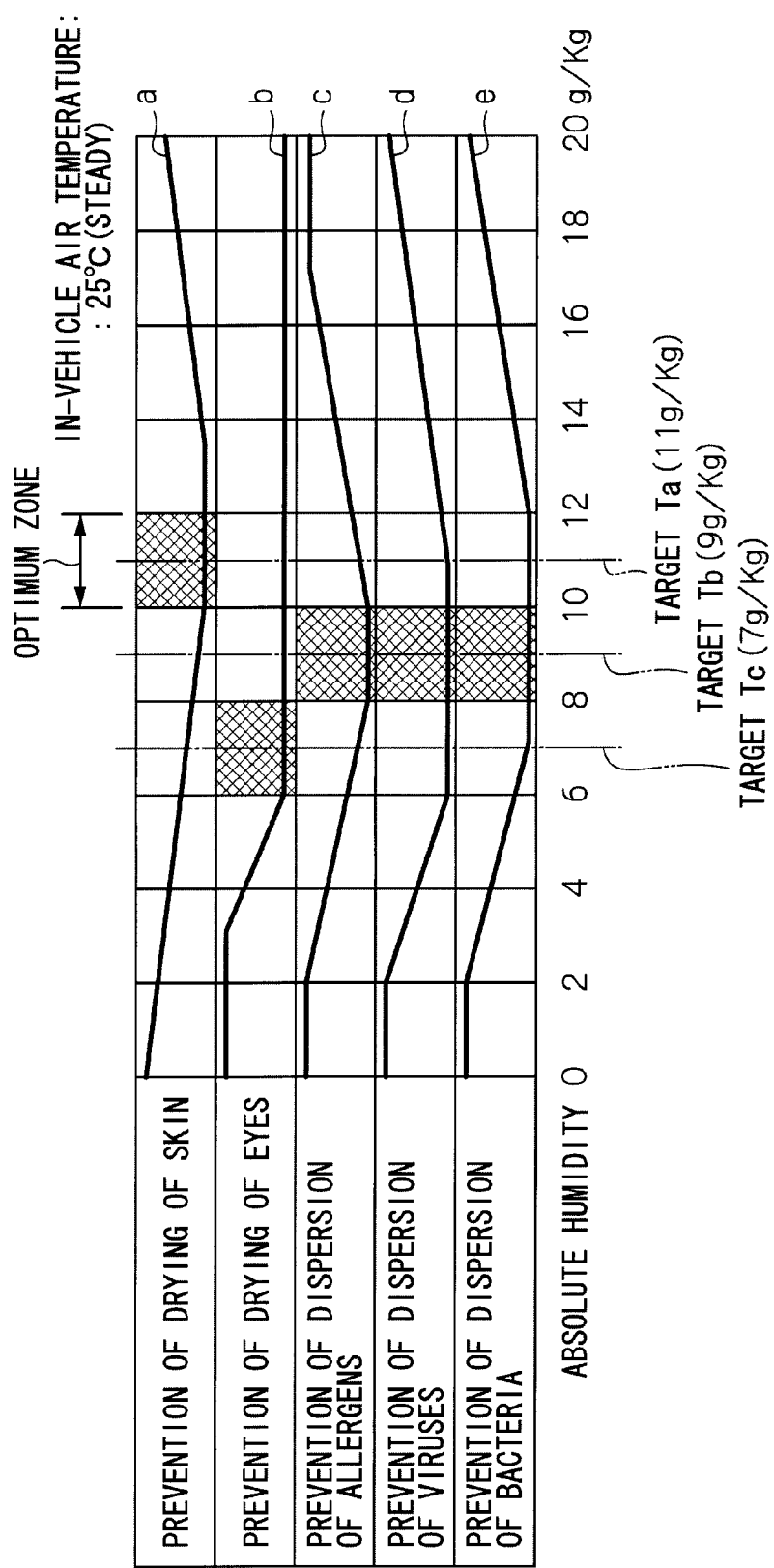
[FIG. 18] An explanatory view showing the relationship between plural object items and targets (target values) of absolute humidity in a vehicle cabin.

In other words, as shown in line graph a in FIG. 18, when the absolute humidity in the vehicle cabin is 0 to 10 g/Kg, the effect of prevention of drying of the skin of the passenger in the vehicle cabin is low, and, conversely, when the absolute humidity in the vehicle cabin is 12 to 20 g/Kg, the passenger feels uncomfortable and the windows in the vehicle cabin fog up, for example.

With respect thereto, in order to prevent drying of the skin of the passenger in the vehicle cabin, it is optimum for the absolute humidity in the vehicle cabin to be 10 to 12 g/Kg. Thus, in the present embodiment, an absolute humidity of 11 g/Kg, which is the center value of an absolute humidity of 10 to 12 g/Kg in the vehicle cabin, is set as a target Ta (target value) of the absolute humidity in the vehicle cabin for "prevention of drying of the skin of the passenger in the vehicle cabin".

Further, as shown in line graph b in FIG. 18, when the absolute humidity in the vehicle cabin is 0 to 6 g/Kg, the effect of prevention of drying of the eyes of the passenger in the vehicle cabin is low, and, conversely, when the absolute humidity in the vehicle cabin is 8 to 20 g/Kg, the passenger feels uncomfortable and the windows in the vehicle cabin 82 fog up, for example.

With respect thereto, in order to prevent drying of the eyes of the passenger in the vehicle cabin, it is optimum for the absolute humidity in the vehicle cabin to be 6 to 8 g/Kg. Thus, in the present embodiment, an absolute humidity of 7 g/Kg, which is the center value of an absolute humidity of 6 to 8 g/Kg in the vehicle cabin, is set as a target Tc (target value) of the absolute humidity in the vehicle cabin for "prevention of drying of the eyes of the passenger in the vehicle cabin".

Moreover, as shown in line graphs c, d and e in FIG. 18, when the absolute humidity in the vehicle cabin is 0 to 8 g/Kg, the effect of prevention of dispersion of allergens in the vehicle cabin, prevention of dispersion of viruses in the vehicle cabin and prevention of dispersion of bacteria in the vehicle cabin is low, and, conversely, when the absolute humidity in the vehicle cabin is 10 to 20 g/Kg, the passenger feels uncomfortable and the windows in the vehicle cabin fog up, for example.

With respect thereto, in order to prevent dispersion of allergens in the vehicle cabin, dispersion of viruses in the vehicle cabin and dispersion of bacteria in the vehicle cabin, it is optimum for the absolute humidity in the vehicle cabin to be 8 to 10 g/Kg. Thus, in the present embodiment, an absolute humidity of 9 g/Kg, which is the center value of an absolute humidity of 8 to 10 g/Kg in the vehicle cabin, is set as a target Tb (target value) of the absolute humidity in the vehicle cabin for "prevention of dispersion of allergens in the vehicle cabin", "prevention of dispersion of viruses in the vehicle cabin" and "prevention of dispersion of bacteria in the vehicle cabin".

It will be noted that, ordinarily, the vehicle cabin is maintained at a room temperature of around 25° C. by an air conditioner or the like. For this reason, in the present embodiment, the targets Ta, Tb and Tc are set by the absolute humidity rather than by the relative humidity in the vehicle cabin.

Additionally, in the control unit 26, in order to maintain the absolute humidity in the vehicle cabin 82 at the targets Ta, Tb and Tc (target values), as shown in FIG. 16, humidifying patterns Pa, Pb and Pc for defining the humidifying amount per one-time spraying and the interval of intermittent spraying of the humidified air are, for each of the targets Ta, Tb and Tc, determined beforehand and stored.

In other words, the humidifying pattern Pa is set in correspondence to the target Ta (absolute humidity of 11 g/Kg) and, of the three humidifying patterns, has the largest humidifying amount per one-time spraying and the shortest interval of intermittent spraying of the humidified air. In short, the humidifying amount is increased and the spraying interval is shortened because the humidity drops more quickly the higher that the humidity in the vehicle cabin 82 serving as the target is.

Further, the humidifying pattern Pb is set in correspondence to the target Tb (absolute humidity of 9 g/Kg) and, of the three humidifying patterns, has an intermediate humidifying amount per one-time spraying and an intermediate interval of intermittent spraying of the humidified air.

Moreover, the humidifying pattern Pc is set in correspondence to the target Tc (absolute humidity of 7 g/Kg) and, of the three humidifying patterns, has the smallest humidifying amount per one-time spraying and the longest interval of intermittent spraying of humidified air. It will be noted that these humidifying patterns Pa, Pb and Pc are set on the assumption that the absolute humidity in the vehicle cabin prior to humidification is about 5 g/Kg.

Figure 17A:
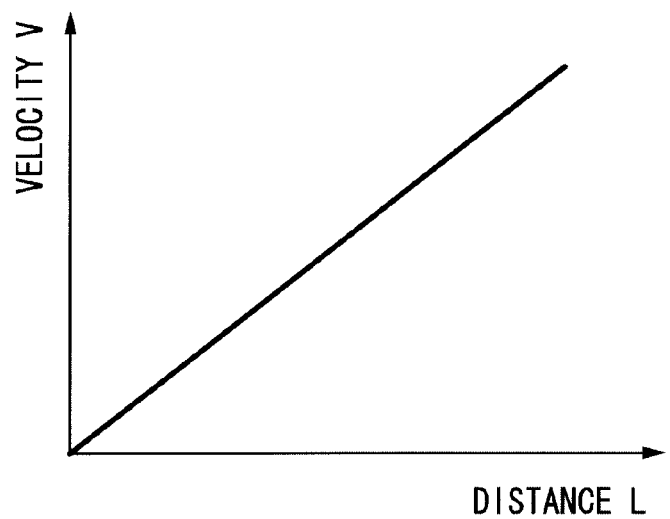
[FIG. 17A] An explanatory view showing the content of information that has been digitized and stored in the control unit shown in FIG. 14.
Figure 17B:
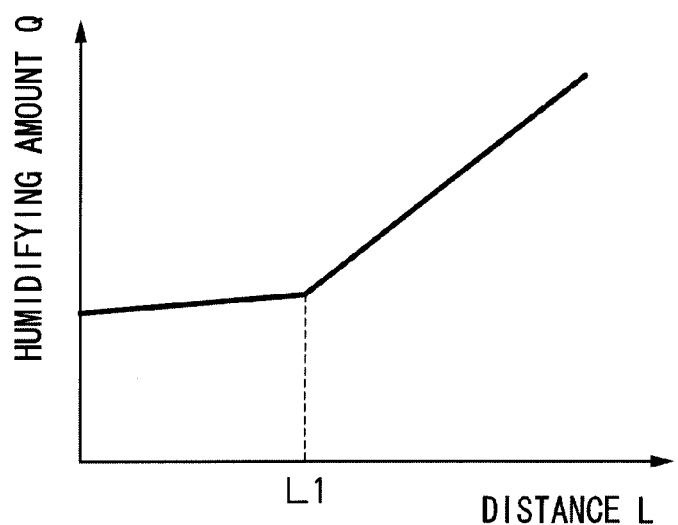
[FIG. 17B] An explanatory view showing the content of information that has been digitized and stored in the control unit shown in FIG. 14.

Further, in the control unit 26, as shown in the graphs of FIG. 17A and FIG. 17B, the relationship between a distance L between the nozzle 86 and the head of the passenger P in the vehicle cabin 82 (more accurately, the distance between the distance sensor 94 and the passenger P) and a spraying velocity V of the humidified air and the relationship between the distance L and a humidifying amount Q per one-time spraying are digitized and stored beforehand.

In other words, in the present embodiment, as shown in FIG. 17A, the spraying velocity V of the humidified air is set to become faster at a constant rate of increase as the distance L between the nozzle 86 and the head of the passenger P in the vehicle cabin 82 increases.

Further, as shown in FIG. 17B, the humidifying amount Q per one-time spraying is set to increase as the distance L between the nozzle 86 and the head of the passenger P in the vehicle cabin 82 increases. At this time, the rate of increase of the humidifying amount Q per one-time spraying is set to increase on the other side of a distance L1 between the nozzle 86 and the head of the passenger P in the vehicle cabin 82.

It will be noted that operation of the control unit 26, in which the aforementioned information has been digitized and stored, will be described in detail below.

Next, operation of the vehicle humidifying/dehumidifying unit 10 in the above-described applied example will be described.

Figure 19:
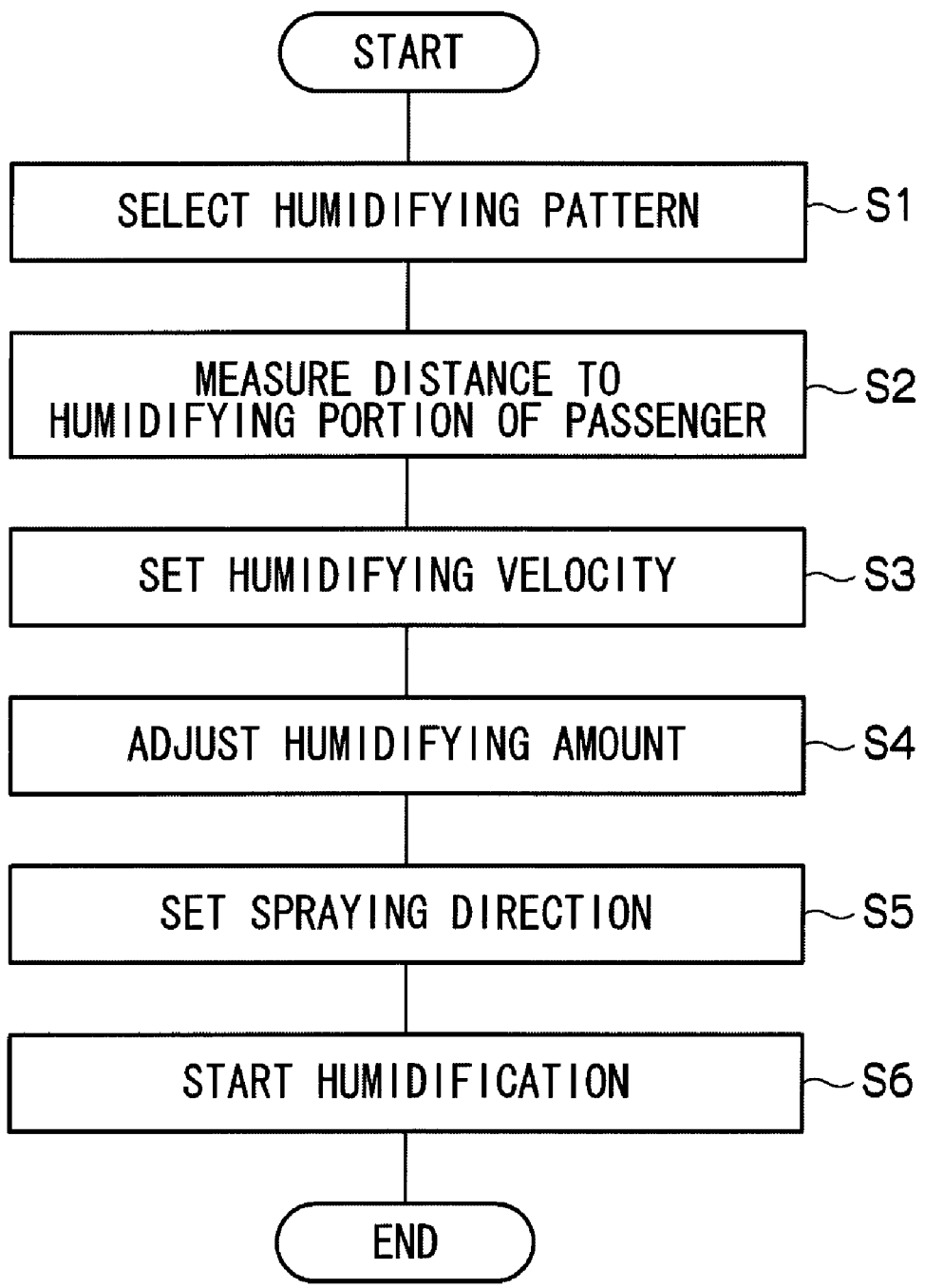
[FIG. 19] A flowchart showing a flow of operation of the control unit shown in FIG. 14.
Figure 20:
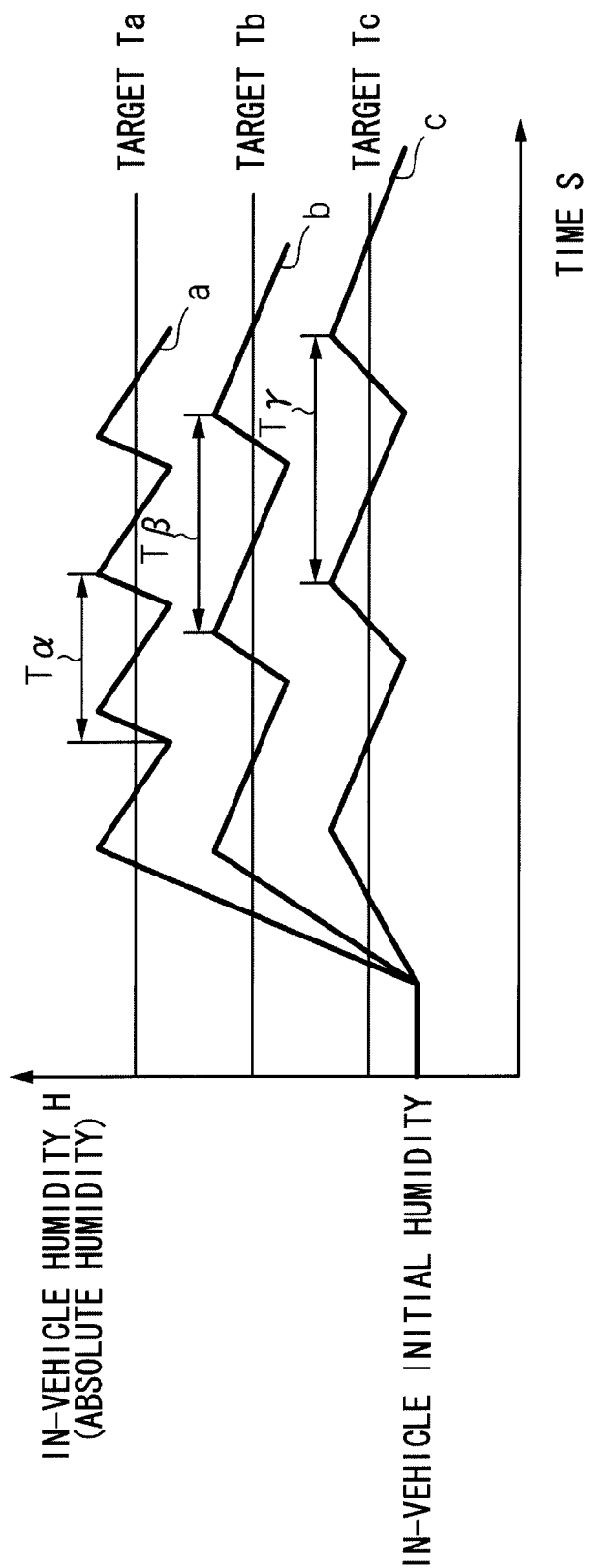
[FIG. 20] An explanatory view showing the relationship between time and absolute humidity in a vehicle cabin that has been humidified by the vehicle humidifying/dehumidifying device shown in FIG. 14.

In FIG. 19, there is shown a flow of operation of the vehicle humidifying/dehumidifying device 10 in the present applied example, and in FIG. 20, there is shown the relationship between time S and absolute humidity H in the vehicle cabin 82 that has been humidified by the vehicle humidifying/dehumidifying device 10 in the present applied example.

First, when the passenger P operates any of the beautiful skin mode switch 100, the dry-eye relieving mode switch 102, the allergen suppressing mode switch 104 and the ALL mode switch 106 disposed in the operation panel 92 shown in FIG. 15, an operation signal corresponding to the switch that the passenger P has operated is outputted to the control unit 26 shown in FIG. 14.

When the operation signal that has been outputted from the operation panel 92 as described above is inputted to the control unit 26, the control unit 26 starts program processing shown in the flowchart of FIG. 19. When the control unit 26 starts the program processing shown in the flowchart of FIG. 19, first, the control unit 26 performs selection of the humidifying patterns shown in FIG. 16 on the basis of the operation signal that has been outputted from the operation panel 92 (step S1).

That is, in the processing of step S1, when the operation signal that has been outputted from the operation panel 92 in response to the beautiful skin mode switch 100 being operated is inputted to the control unit 26, the control unit 26 selects the humidifying pattern Pa in order to prevent drying of the skin of the passenger P in the vehicle cabin 82 using the target Ta (absolute humidity 11 g/Kg) for the absolute humidity in the vehicle cabin 82.

Similarly, in the processing of step S1, when the operation signal that has been outputted from the operation panel 92 in response to the dry-eye relieving mode switch 102 being operated is inputted to the control unit 26, the control unit 26 selects the humidifying pattern Pc in order to prevent drying of the eyes of the passenger P in the vehicle cabin 82 using the target Tc (absolute humidity 7 g/Kg) for the absolute humidity in the vehicle cabin 82.

Further, in the processing of step S1, when the operation signal that has been outputted from the operation panel 92 in response to the allergen suppressing mode switch 104 being operated is inputted to the control unit 26, the control unit 26 selects the humidifying pattern Pb in order to prevent dispersion of allergens, viruses and bacteria in the vehicle cabin 82 using the target Tb (absolute humidity 9 g/Kg) for the absolute humidity in the vehicle cabin 82.

It will be noted that, in the processing of step S1, when the operation signal that has been outputted from the operation panel 92 in response to the ALL mode switch 106 being operated is inputted to the control unit 26, the control unit 26 selects the humidifying pattern Pa in order to realize a comfortable space in the vehicle cabin 82 using the target Ta (absolute humidity 11 g/Kg) for the absolute humidity in the vehicle cabin 82.

Then, after the control unit 26 has selected the humidifying pattern corresponding to the switch of the operation panel 92 as described above, the control unit 26 detects the distance between the nozzle 86 and the head (humidifying portion) of the passenger P in the vehicle cabin 82 (step S2). That is, the control unit 26 outputs a control signal to the distance sensor 94 to actuate the distance sensor 94. The distance sensor 94 actuates when the control signal that has been outputted from the control unit 26 is inputted thereto and outputs to the control unit 26 a measurement signal corresponding to the distance to the head of the passenger P. Then, the measurement signal that has been outputted from the distance sensor 94 is inputted to the control unit 26, and the control unit 26 detects this measurement result as the distance between the nozzle 86 and the head of the passenger P in the vehicle cabin 82.

Next, the control unit 26 sets the spraying velocity (humidifying velocity) of the humidified air (step S3). That is, the control unit 26 calculates and sets (temporarily stores), on the basis of the relationship shown in FIG. 17A between the distance L between the nozzle 86 and the head of the passenger P in the vehicle cabin 82 (more accurately, the distance between the distance sensor 94 and the passenger P) and the spraying velocity V of the humidified air, the spraying velocity of the humidified air from the distance between the nozzle 86 and the head of the passenger P in the vehicle cabin 82 detected in step S2.

At this time, the control unit 26 sets the spraying velocity of the humidified air such that, as shown in the graph in FIG. 17A, the spraying velocity V of the humidified air becomes faster at a constant rate of increase as the distance L between the nozzle 86 and the head of the passenger P in the vehicle cabin 82 increases.

Then, the control unit 26 performs adjustment of the humidifying amount per one-time spraying that is defined by the humidifying pattern that the control unit 26 selected in step S1 (step S4). That is, the control unit 26 performs, on the basis of the relationship shown in FIG. 17B between the distance L between the nozzle 86 and the head of the passenger P in the vehicle cabin (more accurately, the distance between the distance sensor 94 and the passenger P) and the humidifying amount Q per one-time spraying, increase/decrease of the humidifying amount (reference value) per one-time spraying that is defined by the humidifying pattern that the control unit 26 selected in step S1.

For example, when the distance (actual measurement value) between the nozzle 86 and the head of the passenger P in the vehicle cabin 82 detected in step S2 is long with respect to the distance (reference value) between the nozzle 86 and the head of the passenger P in the vehicle cabin 82 defined as a reference value by the humidifying pattern Pa, the control unit 26 calculates, from the relationship shown in the graph in FIG. 17B, the increase amount of the humidifying amount corresponding to this increase in distance and adds this calculated increase amount to the humidifying amount (reference value) defined by the humidifying pattern Pa that the control unit 26 selected in step S1.

It will be noted that, at this time, the control unit 26 sets the humidifying amount per one-time spraying such that, as shown in the graph in FIG. 17B, the humidifying amount Q per one-time spraying increases as the distance between the nozzle 86 and the head of the passenger P in the vehicle cabin 82 increases. Further, at this time, the control unit 26 sets the humidifying amount per one-time spraying such that, as shown in the graph in FIG. 17B, the rate of increase of the humidifying amount Q per one-time spraying increases on the other side of the distance L1 between the nozzle 86 and the head of the passenger P in the vehicle cabin 82.

On the other hand, for example, when the distance (actual measurement value) between the nozzle 86 and the head of the passenger P in the vehicle cabin 82 detected in step S2 is short with respect to the distance (reference value) between the nozzle 86 and the head of the passenger P in the vehicle cabin 82 defined as a reference value by the humidifying pattern Pa, the control unit 26 calculates, from the relationship shown in the graph in FIG. 17B, the decrease amount of the humidifying amount corresponding to this decrease in distance and adds this calculated decrease amount to the humidifying amount (reference value) defined by the humidifying pattern Pa that the control unit 26 selected in step S1.

Next, the control unit 26 sets the spraying direction of the nozzle 86 (step S5). That is, the control unit 26 starts up the thermographic device 96, analyzes the detection data from the thermographic device 96, and identifies the positions of the entire face, eyes, nose and mouth. Then, when the beautiful skin mode switch 100 has been selected, the control unit 26 sets the spraying direction of the nozzle 86 to the entire face of the passenger P. When the dry-eye relieving mode switch 102 has been selected, the control unit 26 sets the spraying direction of the nozzle 86 so as to be centered on the eyes of the passenger P. When the allergen suppressing mode switch 104 has been selected, the control unit 26 sets the spraying direction of the nozzle 86 so as to be centered on the nose and mouth of the passenger P. When the ALL mode switch 106 has been selected, the control unit 26 sets the spraying direction of the nozzle 86 on the entire face of the passenger P.

Then, after the control unit 26 has performed the settings as mentioned above, the control unit 26 outputs a control signal to the nozzle 86 to change the spraying direction of the nozzle 86 and outputs actuation signals to the pair of blowers 12A and 12B, the heater 30, the Peltier element 32 and the switching damper 20 (see FIG. 1 to FIG. 6 for these) to actuate the entire device (step S6).

It will be noted that, at this time, the control unit 26 automatically switches to the "continuous operation mode", the "intermittent operation mode" or the "high-humidity operation mode" in regard to the modes that have been selected by the beautiful skin mode switch 100, the dry-eye relieving mode switch 102, the allergen suppressing mode switch 104 and the ALL mode switch 106 and controls operation of the pair of blowers 12A and 12B, the heater 30, the Peltier element 32 and the switching damper 20.

Then, thus, when the beautiful skin mode switch 100 of the operation panel 92 has been operated, the humidifying amount per one-time spraying is set to be large and the interval of intermittent spraying of the humidified air is set to be short on the basis of the humidifying pattern Pa, and, as shown in line graph a in FIG. 20, the absolute humidity in the vehicle cabin 82 is maintained at the target Ta of 11 g/Kg. It will be noted that, in line graph a in FIG. 20, Tα (Tα<Tβ<Tγ) is an interval of intermittent spraying of the humidified air.

At this time, as shown in line graph a in FIG. 20, the absolute humidity in the vehicle cabin 82 increases/decreases about the target Ta as a result of the humidified air being intermittently sprayed from the nozzle 86, but the upper and lower values of the amplitude of the absolute humidity in the vehicle cabin at this time are adjusted to fall within the optimum humidity range of 10 to 12 g/Kg to prevent drying of the skin of the passenger P in the vehicle cabin 82. Thus, drying of the skin of the passenger P in the vehicle cabin 82 is prevented while preventing the passenger P from feeling uncomfortable and preventing the windows in the vehicle cabin 82 from fogging up.

Similarly, when the dry-eye relieving mode switch 102 of the operation panel 92 has been operated, the humidifying amount per one-time spraying is set to be small and the interval of intermittent spraying of the humidified air is set to be long on the basis of the humidifying pattern Pc, and the absolute humidity in the vehicle cabin 82 is maintained at the target Tc of 7 g/Kg. It will be noted that, in line graph c in FIG. 20, Tβ (Tα<Tβ<Tγ) is an interval of intermittent spraying of the humidified air.

At this time, as shown in line graph c in FIG. 20, the absolute humidity in the vehicle cabin 82 increases/decreases about the target Tc as a result of the humidified air being intermittently sprayed from the nozzle 86, but the upper and lower values of the amplitude of the absolute humidity in the vehicle cabin at this time are adjusted to fall within the optimum humidity range of 6 to 8 g/Kg to prevent drying of the eyes of the passenger P in the vehicle cabin 82. Thus, drying of the eyes of the passenger P in the vehicle cabin 82 is prevented while preventing the passenger P from feeling uncomfortable and preventing the windows in the vehicle cabin 82 from fogging up.

Further, when the allergen suppressing mode switch 104 of the operation panel 92 has been operated, the humidifying amount per one-time spraying and the interval of intermittent spraying of the humidified air are set to be intermediate on the basis of the humidifying pattern Pb, and the absolute humidity in the vehicle cabin 82 is maintained at the target Tb of 9 g/Kg. It will be noted that, in line graph b in FIG. 20, Tγ (Tα<Tβ<Tγ) is an interval of intermittent spraying of the humidified air.

At this time, as shown in line graph b in FIG. 20, the absolute humidity in the vehicle cabin 82 increases/decreases about the target Tb as a result of the humidified air being intermittently sprayed from the nozzle 86, but the upper and lower values of the amplitude of the absolute humidity in the vehicle cabin at this time are adjusted to fall within the optimum humidity range of 8 to 10 g/Kg to prevent dispersion of allergens in the vehicle cabin 82, dispersion of viruses in the vehicle cabin 82 and dispersion of bacteria in the vehicle cabin 82. Thus, dispersion of allergens, viruses and bacteria in the vehicle cabin 82 is prevented while preventing the passenger P from feeling uncomfortable and preventing the windows in the vehicle cabin 82 from fogging up.

It will be noted that, when the ALL mode switch 106 of the operation panel 92 has been operated, the humidifying amount per one-time spraying is set to be large and the interval of intermittent spraying of the humidified air is set to be short on the basis of the humidifying pattern Pa, and the absolute humidity in the vehicle cabin 82 is maintained at the target Ta of 11 g/Kg. Thus, a comfortable vehicle cabin 82 space is provided for the passenger P while preventing the passenger P from feeling uncomfortable and preventing the windows in the vehicle cabin 82 from fogging up.

Further, in the present embodiment, the humidified air is locally sprayed from the nozzle 86 onto the head—and more specifically the entire face, eyes, nose and mouth—of the passenger P in the vehicle cabin 82, and the humidified air from the nozzle 86 is prevented from being sprayed into the vehicle cabin 82.

Moreover, in the present embodiment, as shown in FIG. 17A, the spraying velocity V of the humidified air becomes faster as the distance L between the nozzle 86 and the head of the passenger P in the vehicle cabin 82 increases, and the humidified air from the nozzle 86 is sprayed more distantly and reliably reaches the passenger P.

Further, in the present embodiment, as shown in FIG. 17B, the humidifying amount Q per one-time spraying is increased as the distance L between the nozzle 86 and the head of the passenger P in the vehicle cabin 82 increases, and the amount of the humidified air that reaches the passenger P from the nozzle 86 is maintained.

Further, as described above, the humidified air is blown out from the nozzle 86, and the dehumidified air is blown out from the blowout opening 88 toward the surface of the front window 90 on the vehicle cabin 82 side. Thus, fogging of the front window 90 is also prevented.

It will be noted that, as described above, when the beautiful skin mode switch 100, the dry-eye relieving mode switch 102, the allergen suppressing mode switch 104 or the ALL mode switch 106 is selected and operation of the mode is being performed, it is desirable for the air conditioner of the vehicle 80 to be changed to a front window blowout mode (or to a floorboard blowout mode or to the front window blowout mode and the floorboard blowout mode) such that the humidified air that has been blown out toward the passenger P and the air-conditioned air from the air conditioner of the vehicle 80 do not interfere with each other.

Then, after the elapse of a certain amount of time, or when an unillustrated stop switch is operated, the control unit 26 stops operation. As described above, the vehicle humidifying/dehumidifying device 10 pertaining to the present embodiment operates.

As described in detail above, according to the vehicle humidifying/dehumidifying device 10 pertaining to the first embodiment of the present invention, humidifying amount control corresponding to the selection situation of the beautiful skin mode switch 100, the dry-eye relieving mode switch 102, the allergen suppressing mode switch 104 and the ALL mode switch 106 can be performed, and it becomes possible to provide a more comfortable vehicle cabin 82 space for the passenger P.

Further, according to the vehicle humidifying/dehumidifying device 10 pertaining to the first embodiment of the present invention, the vehicle humidifying/dehumidifying device 10 is provided with the Peltier element 32 for alternately heating the pair of heat exchange elements 28A and 28B and the heater 30 for simultaneously heating the pair of heat exchange elements 28A and 28B, whereby it becomes possible to perform finer humidifying amount control corresponding to various situations in the vehicle cabin.

Next, modifications of the applied example will be described.

In the applied example, the targets Ta, Tb and Tc were set by the absolute humidity rather than by the relative humidity in the vehicle cabin 82, but of course the targets Ta, Tb and Tc may also be set by the relative humidity rather than by the absolute humidity in the vehicle cabin 82.

Further, in the applied example, the humidifying amount per one-time spraying and the interval (humidifying interval) of intermittent spraying of the humidified air were adjusted such that the absolute humidity in the vehicle cabin 82 maintained a target (target value) determined beforehand, but either the humidifying amount per one-time spraying or the interval (humidifying interval) of intermittent spraying of the humidified air may also be adjusted.

Figure 21:
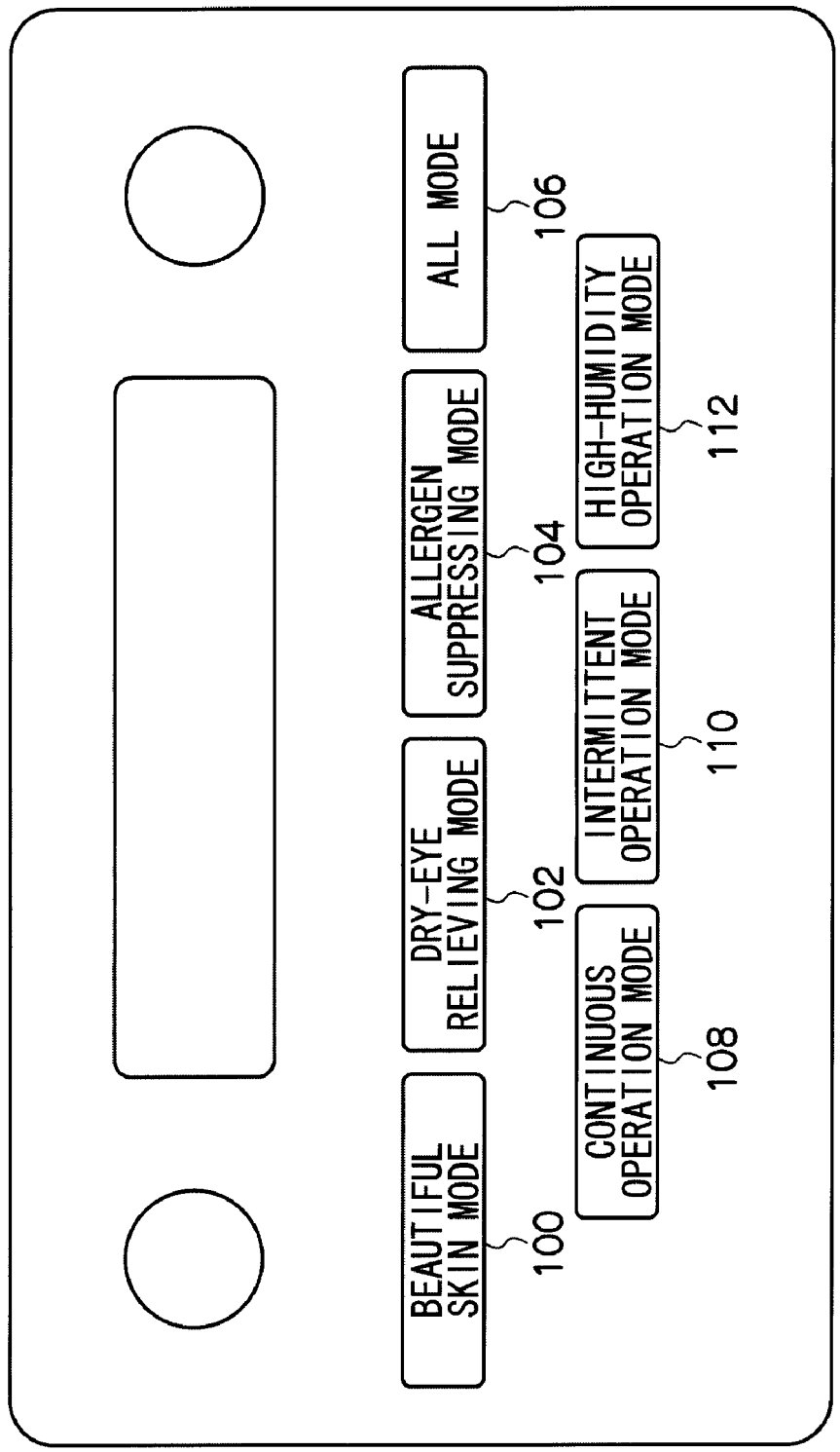
[FIG. 21] A view showing a modification of the operation panel shown in FIG. 15.

Further, in the applied example, the control unit 26 was configured to automatically switch to the operation modes such as the "continuous operation mode" in regard to the modes selected by the beautiful skin mode switch 100 and the like and to control operation of the pair of blowers 12A and 12B, the heater 30, the Peltier element 32 and the switching damper 20, but as shown in FIG. 21, the invention may also be configured such that a continuous operation mode switch 108, an intermittent operation mode switch 110 and a high-humidity operation mode switch 112 are disposed on the operation panel 92, the control unit 26 switches to the operation modes as a result of these switches being selected and controls operation of the pair of blowers 12A and 12B, the heater 30, the Peltier element 32 and the switching damper 20.

The invention claimed is:

1. A vehicle humidifying/dehumidifying device comprising:
a humidifying/dehumidifying unit provided with a pair of heat exchange components, each of which includes an adsorbent that is capable of adsorbing airborne moisture, and a heating component for heating the pair of heat exchange components, the humidifying/dehumidifying unit configured to generate humidified air and dehumidified air from air that has been introduced to the pair of heat exchange components;
a humidifying flow path for blowing out, to a first region including a passenger region in a vehicle cabin, the humidified air that has been generated by the humidifying/dehumidifying unit;
a dehumidifying flow path for blowing out, to a second region different from the first region, the dehumidified air that has been generated by the humidifying/dehumidifying unit;
a switching component for switching communicated states between the heat exchange components of the humidifying/dehumidifying unit and the humidifying flow path and the dehumidifying flow path;
a blowing component for forming airflows that blow out from the humidifying flow path and the dehumidifying flow path via the heat exchange components of the humidifying/dehumidifying unit; and
a humidifying amount increasing component which comprises a heating control component configured to control the heating component such that the heating component simultaneously and intermittently heats the pair of heat exchange components, whereby, when the vehicle humidifying/dehumidifying device is switched from a normal mode to a humidifying amount increasing mode, increasing the humidifying amount imparted to the humidified air when the humidified air is generated by the humidifying/dehumidifying unit, to more than that of the normal mode.

2. The vehicle humidifying/dehumidifying device of claim 1, wherein the humidifying amount increasing component is provided with an air introduction amount adjusting component for adjusting the amount of air introduced to the heat exchange components such that the amount of air introduced to the heat exchange components that are unheated becomes larger than the amount of air introduced to the heat exchange components that are being heated by the heating component.

3. The vehicle humidifying/dehumidifying device of claim 2, wherein the air introduction amount adjusting component is provided with a blowing amount adjusting component for adjusting the blowing amount of the blowing component such that the blowing amount that the blowing component blows to the heat exchange components that are unheated becomes larger than the blowing amount that the blowing component blows to the heat exchange components that are being heated by the heating component.

4. The vehicle humidifying/dehumidifying device of claim 2, wherein the air introduction amount adjusting component is provided with
a blowing ratio changing component that is disposed between the blowing component and the pair of heat exchange components and is capable of operating so as to change the ratio of air blown from the blowing component to the pair of heat exchange components and
a blowing ratio control component for controlling operation of the blowing ratio changing component such that the blowing amount blown from the blowing component to the heat exchange component of the pair of heat exchange components that is unheated becomes larger than the blowing amount blown from the blowing component to the heat exchange component of the pair of heat exchange components that is being heated by the heating component.

5. A vehicle humidifying/dehumidifying device comprising:
- a humidifying/dehumidifying unit provided with a pair of heat exchange components, each of which includes an adsorbent that is capable of adsorbing airborne moisture, and a heating component configured to heat the pair of heat exchange components, the humidifying/dehumidifying unit configured to generate humidified air and dehumidified air from air that has been introduced to the pair of heat exchange components;
- a humidifying flow path for blowing out, to a first region including a passenger region in a vehicle cabin, the humidified air that has been generated by the humidifying/dehumidifying unit;
- a dehumidifying flow path for blowing out, to a second region different from the first region, the dehumidified air that has been generated by the humidifying/dehumidifying unit;
- a switching component for switching communicated states between the heat exchange components of the humidifying/dehumidifying unit and the humidifying flow path and the dehumidifying flow path;
- a blowing component for forming airflows that blow out from the humidifying flow path and the dehumidifying flow path via the heat exchange components of the humidifying/dehumidifying unit; and
- a humidifying amount increasing component which, when the vehicle humidifying/dehumidifying device is switched from a normal mode to a humidifying amount increasing mode, increases the humidifying amount imparted to the humidified air when the humidified air is generated by the humidifying/dehumidifying unit, to more than that of the normal mode,
- wherein the heating component is provided with
- a first heating component configured to alternately heat the pair of heat exchange components and
- a second heating component configured to simultaneously heat the pair of heat exchange components.

6. The vehicle humidifying/dehumidifying device of claim 5, wherein the humidifying amount increasing component is provided with an air introduction amount adjusting component for adjusting the amount of air introduced to the heat exchange components such that the amount of air introduced to the heat exchange components that are unheated becomes larger than the amount of air introduced to the heat exchange components that are being heated by the heating component.

7. The vehicle humidifying/dehumidifying device of claim 6, wherein the air introduction amount adjusting component is provided with a blowing amount adjusting component for adjusting the blowing amount of the blowing component such that the blowing amount that the blowing component blows to the heat exchange components that are unheated becomes larger than the blowing amount that the blowing component blows to the heat exchange components that are being heated by the heating component.

8. The vehicle humidifying/dehumidifying device of claim 6, wherein the air introduction amount adjusting component is provided with
- a blowing ratio changing component that is disposed between the blowing component and the pair of heat exchange components and is capable of operating so as to change the ratio of air blown from the blowing component to the pair of heat exchange components and
- a blowing ratio control component for controlling operation of the blowing ratio changing component such that the blowing amount blown from the blowing component to the heat exchange component of the pair of heat exchange components that is unheated becomes larger than the blowing amount blown from the blowing component to the heat exchange component of the pair of heat exchange components that is being heated by the heating component.

* * * * *